(12) United States Patent
Xin et al.

(10) Patent No.: US 10,298,335 B1
(45) Date of Patent: May 21, 2019

(54) CO-CHANNEL INTERFERENCE REDUCTION IN MMWAVE NETWORKS

(71) Applicants: Yan Xin, Ottawa (CA); Sheng Sun, Ottawa (CA); Huan Wu, Ottawa (CA)

(72) Inventors: Yan Xin, Ottawa (CA); Sheng Sun, Ottawa (CA); Huan Wu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/148,374

(22) Filed: Oct. 1, 2018

Related U.S. Application Data

(60) Provisional application No. 62/579,659, filed on Oct. 31, 2017.

(51) Int. Cl.
*H04B 15/00* (2006.01)
*H04L 25/02* (2006.01)
*H04W 40/16* (2009.01)
*H04B 17/345* (2015.01)

(52) U.S. Cl.
CPC .......... *H04B 15/00* (2013.01); *H04B 17/345* (2015.01); *H04L 25/0202* (2013.01); *H04W 40/16* (2013.01)

(58) Field of Classification Search
CPC ..... H04B 15/00; H04B 17/345; H04W 40/16; H04L 25/0202
See application file for complete search history.

(56) References Cited

U.S. PATENT DOCUMENTS

| 8,830,917 B1 * | 9/2014 | Zhang | H04W 4/00 370/329 |
| 8,891,592 B1 * | 11/2014 | Zhang | H04W 56/00 375/149 |
| 9,793,964 B1 | 10/2017 | Lomayev et al. | |
| 2008/0181323 A1 * | 7/2008 | Waters | H04L 1/206 375/260 |
| 2009/0285319 A1 * | 11/2009 | Zhang | H04J 13/0014 375/260 |
| 2010/0091911 A1 * | 4/2010 | Sawai | H04L 5/0023 375/340 |

(Continued)

FOREIGN PATENT DOCUMENTS

| CN | 104994050 A | 10/2015 |
| CN | 105142212 A | 12/2015 |
| WO | 2016167891 A1 | 10/2016 |

*Primary Examiner* — Lewis G West

(57) ABSTRACT

Methods and devices for receiving or transmitting a wireless packet are described. A wireless packet includes a short training field (STF) and a channel estimation field (CEF). The receiver determines whether the received STF matches an assigned STF assigned for a target link, by performing cross-correlation between the STF and a component sequence from a set of at least four different component sequences which are pairs of Golay sequences. The cross-correlation output is compared with an expected output. When the received STF matches the assigned STF, the wireless packet is considered a target packet. A channel estimation is performed using a cross-correlation of the received CEF with an assigned CEF assigned for the target link. The assigned CEF is from a set of two or more CEFs, where each CEF is formed using the set of component sequences, and the CEFs are pairwise zero-correlation zone (ZCZ) sequences.

19 Claims, 28 Drawing Sheets

(56) References Cited

U.S. PATENT DOCUMENTS

| | | | |
|---|---|---|---|
| 2010/0260159 A1* | 10/2010 | Zhang | H04L 27/2613 370/338 |
| 2011/0051705 A1* | 3/2011 | Jones, IV | H04L 27/2613 370/338 |
| 2011/0149927 A1* | 6/2011 | Stacey | H04L 1/0046 370/338 |
| 2013/0064124 A1* | 3/2013 | Sun | H04L 7/042 370/252 |
| 2013/0107912 A1* | 5/2013 | Ponnampalam | H04L 27/0008 375/147 |
| 2013/0136198 A1* | 5/2013 | Chavali | H04L 27/2663 375/260 |
| 2014/0003474 A1* | 1/2014 | Xin | H04J 13/0011 13/11 |
| 2014/0003475 A1* | 1/2014 | Xin | H04J 13/0014 13/14 |
| 2014/0071892 A1* | 3/2014 | Liu | H04W 8/00 370/328 |
| 2014/0086362 A1* | 3/2014 | Dhayni | H04L 27/2691 375/329 |
| 2014/0126390 A1* | 5/2014 | Teplitsky | H04L 25/062 370/252 |
| 2014/0204928 A1* | 7/2014 | Sorin | H04W 56/001 370/338 |
| 2014/0233478 A1* | 8/2014 | Wentink | H04L 5/0055 370/329 |
| 2014/0321479 A1* | 10/2014 | Zhang | H04J 13/102 370/474 |
| 2014/0369213 A1* | 12/2014 | Kim | H04W 72/085 370/252 |
| 2015/0381311 A1* | 12/2015 | Zhang | H04W 84/02 714/800 |
| 2016/0006557 A1* | 1/2016 | Shirakawa | H04L 27/22 375/362 |
| 2016/0150591 A1* | 5/2016 | Tarighat Mehrabani | H04W 52/38 370/329 |
| 2016/0226622 A1* | 8/2016 | Kasher | H04L 1/0005 |
| 2016/0241425 A1* | 8/2016 | Xin | H04L 27/3455 |
| 2017/0118656 A1* | 4/2017 | Xin | H04W 16/28 |
| 2017/0171861 A1* | 6/2017 | Seok | H04W 74/0816 |
| 2017/0195916 A1 | 7/2017 | Tujkovic et al. | |
| 2018/0262366 A1* | 9/2018 | Sahin | H04B 7/0452 |

* cited by examiner

| STF 202 | CEF 204 | HEADER 206 | DATA 208 | TRAINING FIELDS 210 |

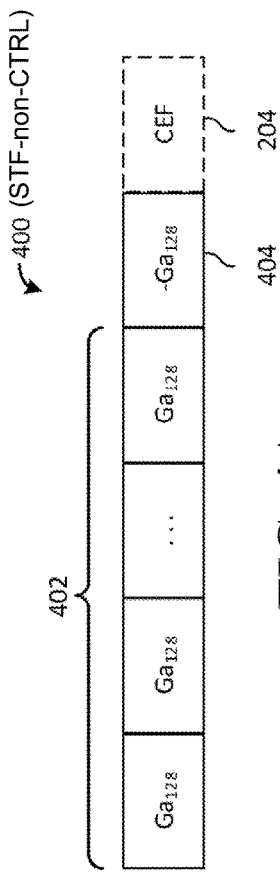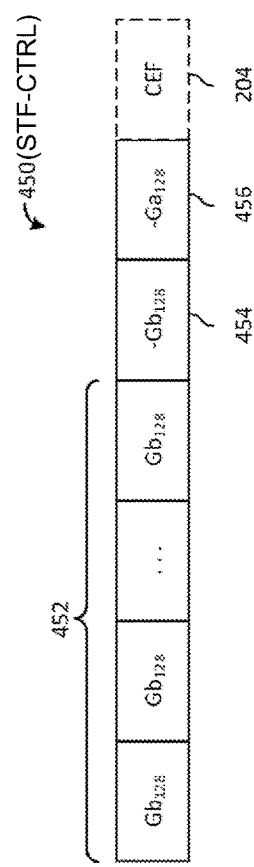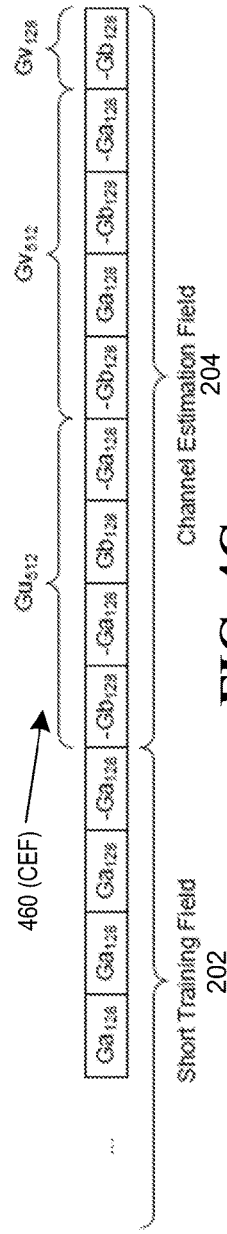

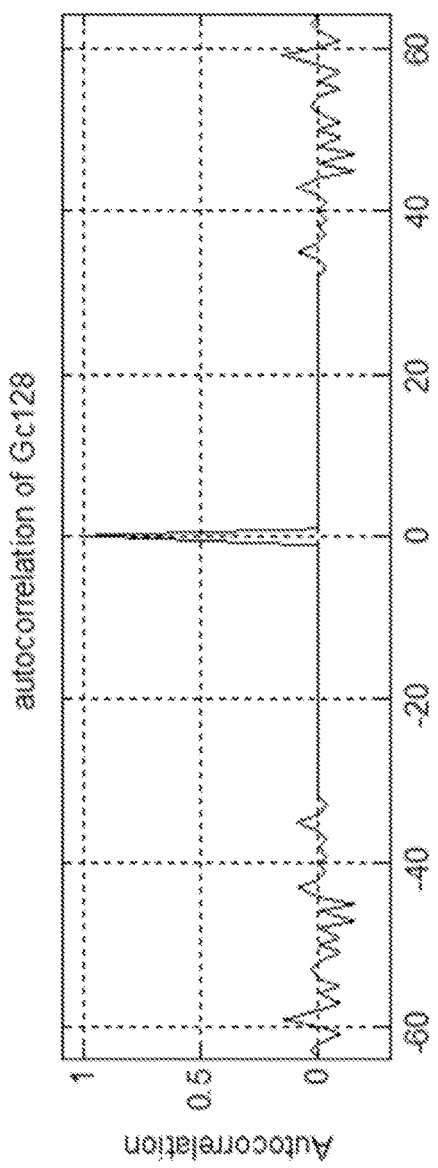
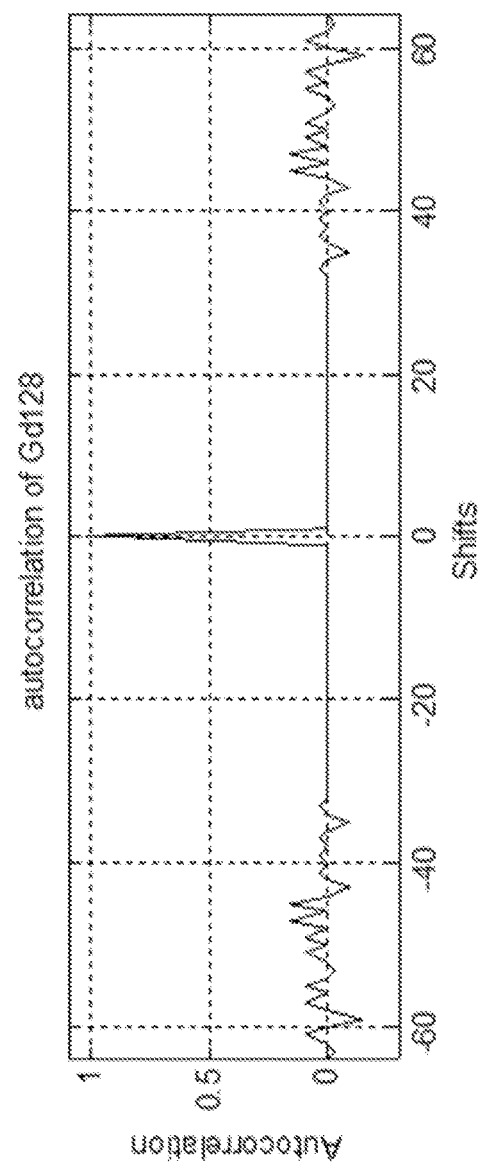

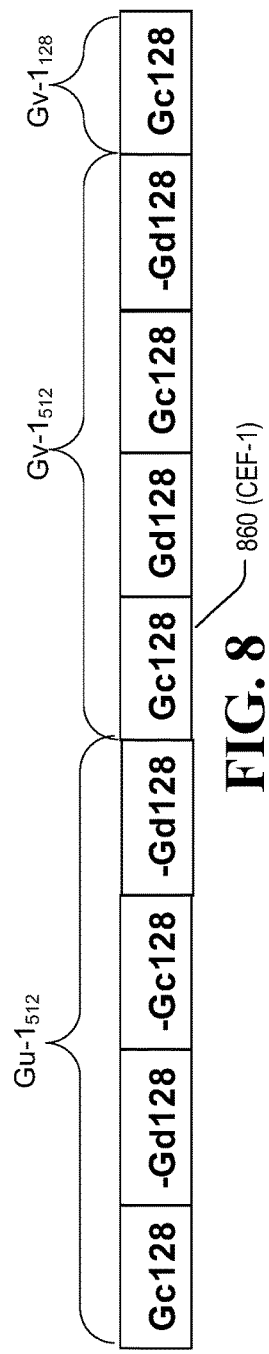
FIG. 8
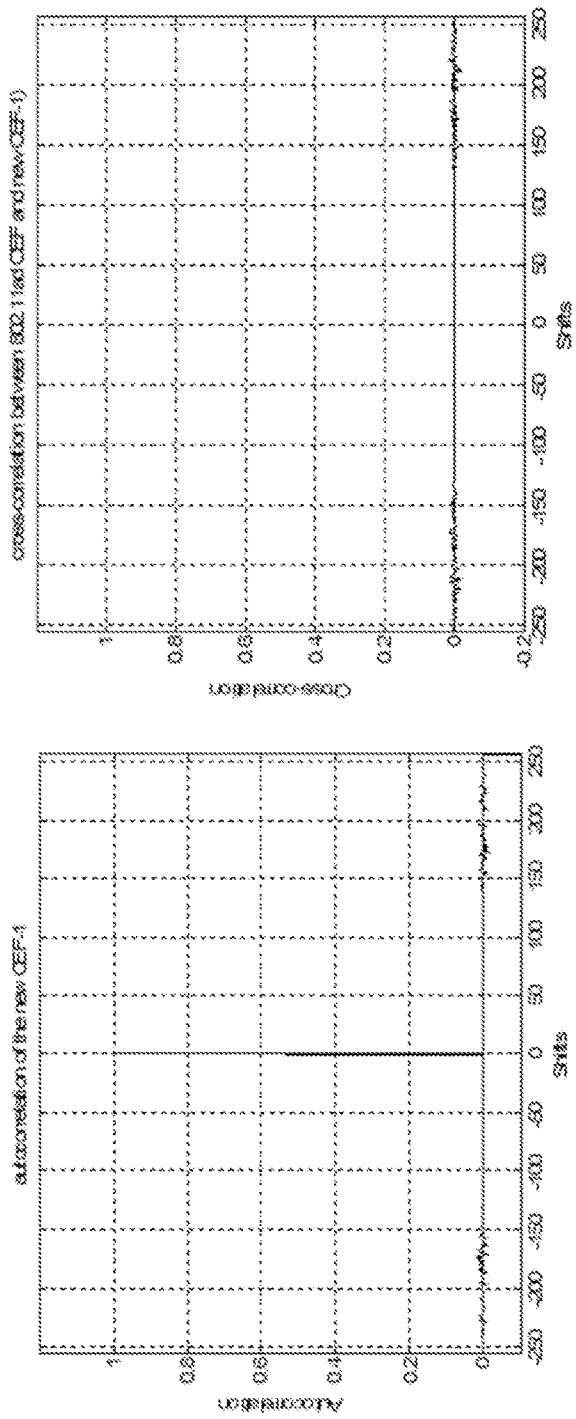
FIG. 9A
FIG. 9B

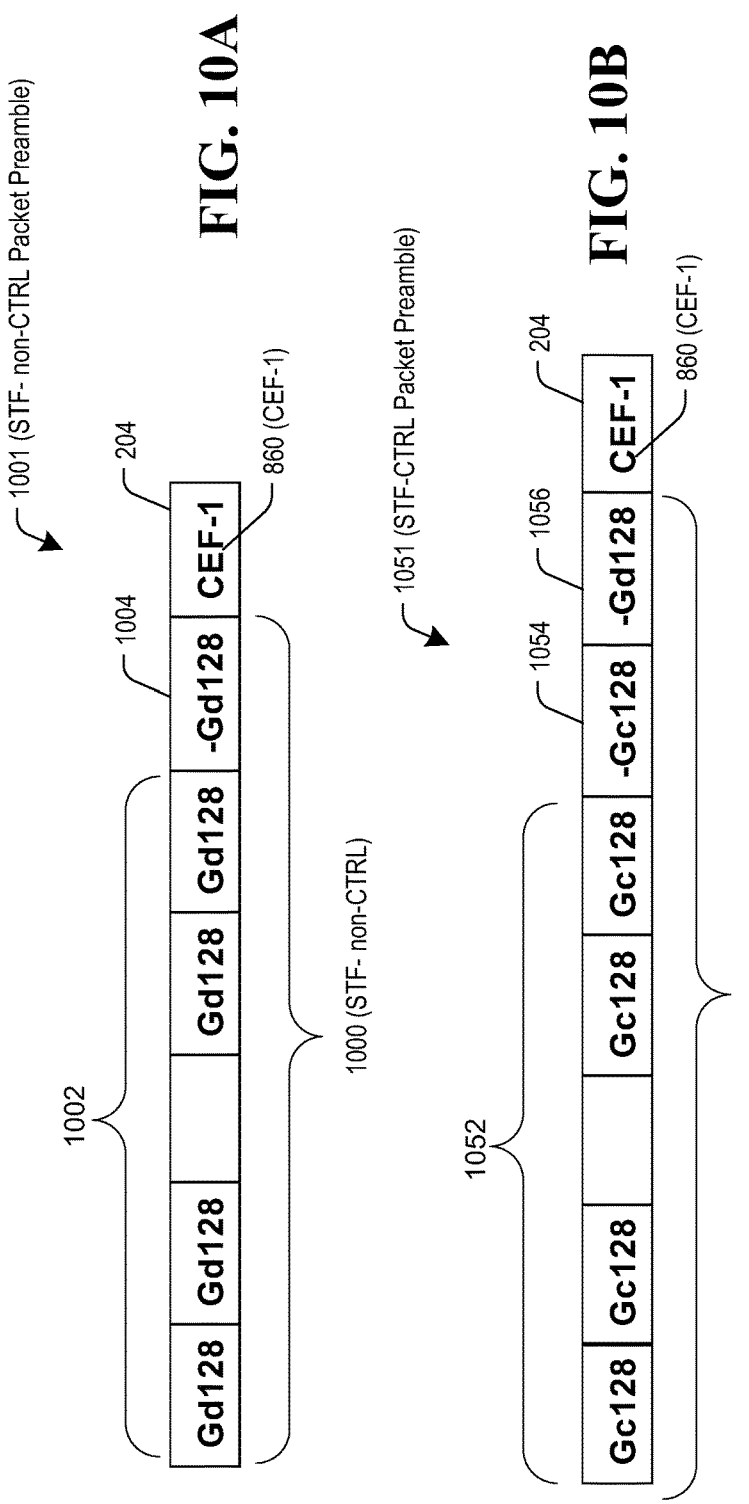

FIG. 18

CEF-A: -Gb128 | -Ga128 | -Gb128 | Ga128 | -Gb128 | Ga128 | -Ga128 | -Gb128

CEF-B: -Gb128 | Ga128 | Gb128 | -Gb128 | -Ga128 | Gb128 | -Ga128 | -Gb128

CEF-C: Gc128 | -Gd128 | Gc128 | Gd128 | Gc128 | Gd128 | Gc128 | -Gd128 | Gc128

CEF-D: Gc128 | Gd128 | -Gc128 | Gd128 | Gc128 | -Gc128 | -Gd128 | -Gd128 | Gc128

CEF-B: -Gb128 | Ga128 | Ga128 | Gb128 | -Gb128 | Ga128 | -Ga128 | Gb128 | Ga128 | -Gb128

CEF-D: Gc128 | Gd128 | -Gc128 | Gd128 | -Gc128 | Gd128 | -Gd128 | Gc128 | -Gc128 | Gd128

CEF-E: Ga128 | -Gb128 | Gb128 | Ga128 | Gb128 | Ga128 | Gb128 | Ga128 | -Gb128 | Ga128

CEF-F: -Gd128 | -Gc128 | Gc128 | -Gd128 | Gc128 | -Gd128 | Gd128 | -Gc128 | -Gc128 | -Gd128

2202

CO-CHANNEL INTERFERENCE REDUCTION IN MMWAVE NETWORKS

CROSS-REFERENCE TO RELATED APPLICATIONS

The present disclosure claims priority from U.S. provisional patent application No. 62/579,659, filed Oct. 31, 2017, entitled "CO-CHANNEL INTERFERENCE REDUCTION IN MMWAVE NETWORKS", the entirety of which is hereby incorporated by reference.

FIELD

The present disclosure relates generally to wireless networks, and in particular embodiments, to techniques and mechanisms for synchronization and channel estimation in dense deployment of millimeter wave (mmWave) networks.

BACKGROUND

With the increasing demands of high-definition (HD) displays and other applications, and with the widespread usage of smart phones and tablets, next generation WLANs capable of transmission at higher data rates in the millimeter wave (mmWave) bands are needed. The IEEE 802.11ad (directional multi-gigabit (DMG)) specification provides a WLAN technique that operates in the globally unlicensed 60 GHz band, e.g., 57-71 GHz. Next generation 60 GHz WLANs (EDMG) such as IEEE 802.11ay (evolved DMG (EDMG)) are currently being developed that will be capable of even higher performance than 802.11ad, and will also provide backward compatibility and coexistence with 802.11ad.

Training sequences typically take the form of sequences or waveforms known to both the transmitter and the receiver. Training sequences are used mainly for the purpose of synchronization and channel estimation, and may also carry other information (e.g., signaling or user information, etc.) that can be detected, typically blindly, on the receiver side. The IEEE 802.11ad specification defines a frame structure that includes two fields for training sequences, namely a short training field (STF) and a channel estimation field (CEF). The channel estimation field (CEF) is used for finer synchronization.

It would be useful to provide improved training sequences that can mitigate against co-channel interference in the context of next generation mmWave networks such as IEEE 802.11ay.

SUMMARY

In at least some examples, the methods and systems disclosed herein introduce new STFs and CEFs that may help reduce co-channel interference between communication links that share the same time duration and the same spectrum. In at least some examples, STFs and CEFs are used to allow access points (APs) and stations (STAs) to detect potential co-channel interference due to spatial sharing in mmWave, to estimate a target channel and an interfering channel, and/or to mitigate the co-channel interference.

In some aspects, the present disclosure describes a method at a receiver. The method includes determining which of a plurality of preamble component sequences in a set of preamble component sequences is assigned for a target channel for the receiver, wherein any pair of the preamble component sequences of the set will cross-correlate to provide a zero-correlation-zone (ZCZ). The method also includes receiving a wireless packet including a short training field (STF) and a channel estimation field (CEF). The method also includes determining, for each of the preamble component sequences in the set, a quantity of cross-correlation peaks between the preamble component sequence and the STF. The method also includes determining, based on the quantity of cross-correlation peaks for each of the preamble component sequences, if the wireless packet is a target packet transmitted in the target channel for the receiver or if the wireless packet is an interfering packet that was not transmitted for the receiver. The method also includes estimating, if the wireless packet is determined to be a target packet, the target channel based on a cross-correlation of the received CEF and the assigned target CEF sequence. The method also includes estimating, if the wireless packet is determined to be an interfering packet, an interfering channel based on a cross-correlation of the received CEF and a CEF sequence other than the assigned target CEF sequence. The method also includes demodulating, if the wireless packet is a target packet, a payload of the wireless packet based on at least the channel estimation for the target channel.

In some aspects, the present disclosure provides a method at a receiver. The method includes receiving a wireless packet including a received short training field (STF) and a received channel estimation field (CEF). The method also includes determining whether the received STF matches an assigned STF assigned for a target link for the receiver, by performing cross-correlation between the STF and at least one component sequence from a set of at least four different component sequences, the set of at least four different component sequences being a set of pairs of Golay sequences, and comparing an output of the cross-correlation with an expected output, wherein when the received STF matches the assigned STF, the wireless packet is determined to be a target packet for the target link for the receiver. The method also includes performing a channel estimation by performing a cross-correlation of the received CEF with an assigned CEF assigned for the target link for the receiver, the assigned CEF being assigned from a set of two or more CEFs, each CEF in the set of CEFs being formed using one or more sequences from the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ. The method also includes demodulating or ignoring a remaining portion of the wireless packet, based on whether the wireless packet is a target packet.

In any of the preceding aspects/embodiments, the set of at least four different component sequences may include at least one of sequence $Gc_{128}$ or sequence $Gd_{128}$ wherein:

The Sequence $Gc_{128}$, from left to right, up to down, has binary values:

+1 −1 −1 +1 −1 +1 −1 +1 −1 −1 −1 −1 +1 +1 −1 −1 +1 −1 −1 +1 +1 −1 +1 −1 −1 −1 −1 −1 −1 −1 +1 +1
−1 +1 +1 −1 +1 −1 +1 −1 +1 +1 +1 +1 −1 −1 +1 +1 +1 −1 −1 +1 +1 −1 +1 −1 −1 −1 −1 −1 −1 −1 +1 +1

-continued

−1 +1 +1 −1 +1 −1 +1 −1 +1 +1 +1 −1 −1 +1 +1 −1 +1 +1 −1 −1 +1 −1 +1 +1 +1 +1 +1 +1 +1 −1 −1
−1 +1 +1 −1 +1 −1 +1 −1 +1 +1 +1 +1 −1 −1 +1 +1 +1 −1 −1 +1 +1 −1 +1 −1 −1 −1 −1 −1 −1 +1 +1

The Sequence $Gd_{128}$ from left to right, up to down, has binary values:

+1 −1 −1 +1 −1 +1 −1 +1 −1 −1 −1 −1 +1 +1 −1 −1 +1 +1 −1 +1 −1 −1 −1 −1 −1 −1 −1 +1 +1
−1 +1 +1 −1 +1 −1 +1 +1 +1 +1 −1 +1 +1 +1 +1 −1 −1 +1 +1 −1 +1 −1 −1 −1 −1 −1 −1 −1 +1 +1
+1 −1 −1 +1 −1 +1 −1 +1 −1 −1 −1 −1 +1 +1 −1 −1 +1 +1 −1 +1 −1 −1 −1 −1 −1 −1 −1 +1 +1
+1 −1 −1 +1 −1 +1 −1 +1 −1 −1 −1 −1 +1 +1 −1 −1 +1 −1 +1 +1 +1 +1 +1 +1 −1 −1

In any of the preceding aspects/embodiments, the set of at least four different component sequences may include both of the sequences $Gc_{128}$ and $Gd_{128}$.

In any of the preceding aspects/embodiments, the set of at least four different component sequences may include sequence $Ga_{128}$ and sequence $Gb_{128}$, wherein:

The Sequence $Ga_{128}$, from left to right, up to down, has binary values:

+1 +1 −1 −1 −1 −1 −1 −1 +1 −1 +1 +1 −1 +1 +1 +1 +1 −1 −1 +1 +1 +1 +1 −1 +1 +1 −1 +1 +1 −1
−1 −1 +1 +1 +1 +1 +1 +1 −1 +1 −1 −1 +1 +1 −1 −1 +1 +1 +1 +1 −1 +1 −1 +1 −1 +1 +1 −1
+1 +1 −1 −1 −1 −1 −1 −1 +1 −1 +1 +1 −1 +1 +1 +1 +1 −1 −1 +1 +1 +1 +1 −1 +1 +1 −1
+1 +1 −1 −1 −1 −1 −1 −1 +1 −1 +1 +1 −1 −1 +1 +1 −1 −1 −1 +1 −1 +1 −1 +1 −1 −1 +1

The Sequence $Gb_{128}$ from left to right, up to down, has binary values:

−1 −1 +1 +1 +1 +1 +1 +1 −1 +1 −1 −1 +1 +1 −1 −1 −1 +1 +1 −1 −1 −1 +1 −1 +1 −1 +1 −1 −1 +1
+1 +1 −1 −1 −1 −1 −1 −1 +1 −1 +1 +1 −1 −1 +1 +1 −1 −1 −1 +1 −1 +1 −1 +1 −1 +1 −1 −1 +1
+1 +1 −1 −1 −1 −1 −1 −1 +1 −1 +1 +1 −1 −1 +1 +1 +1 −1 +1 −1 +1 −1 +1 −1 +1 −1 +1 +1 −1
+1 +1 −1 −1 −1 −1 −1 −1 +1 −1 +1 +1 −1 −1 +1 −1 +1 +1 −1 +1 −1 +1 −1 +1 −1 −1 +1

In any of the preceding aspects/embodiments, comparing an output of the cross-correlation with an expected output may include: determining a quantity of cross-correlation peaks between the at least one component sequence and the received STF; and comparing the determined quantity of cross-correlation peaks to an expected number of cross-correlation peaks for the assigned STF. A match between the determined quantity of cross-correlation peaks and the expected number of cross-correlation peaks may indicate that the wireless packet is a target packet transmitted in the target link for the receiver.

In any of the preceding aspects/embodiments, the method may also include: after determining that the wireless packet is a target packet for the receiver, performing the channel estimation for the target link based on a cross-correlation of the received CEF and the assigned CEF; and demodulating a payload in the remaining portion of the wireless packet, based on at least the channel estimation for the target link.

In any of the preceding aspects/embodiments, the method may also include: after determining that the wireless packet is not a target packet for the receiver, performing the channel estimation for an interfering link based on a cross-correlation of the received CEF and another CEF, other than the assigned CEF, in the set of CEFs; and ignoring the remaining portion of the wireless packet.

In any of the preceding aspects/embodiments, the method may also include: receiving, from a network controller, an indication of the assigned STF to be used for determining whether the wireless packet is a target packet for the receiver.

In any of the preceding aspects/embodiments, the method may also include: transmitting, to the network controller, information regarding measured co-channel interference conditions. The assigned sequence may be assigned by the network controller based on the information regarding measured co-channel interference conditions.

In any of the preceding aspects/embodiments, the method may also include: storing a plurality of assigned STFs or assigned component sequences from the set of at least four different component sequences, wherein each assigned STF or assigned component sequence is assigned to a respective link; and determining which of the plurality of assigned STFs or assigned component sequences to use for determining whether the wireless packet is a target packet for the receiver, based on the link for a target packet for the receiver.

In some aspects, the present disclosure describes a method at a transmitter. The method includes storing at least one assigned short training field (STF) sequence and at least one assigned channel estimation field (CEF) sequence. The assigned STF sequence is formed from one component sequence of a set of at least four different component sequences, the set of at least four different component sequences being a set of pairs of Golay sequences. The assigned CEF sequence is from a set of two or more CEFs, each CEF in the set of CEFs being formed from one or more sequences of the set of component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ. The method also includes generating a wireless packet including the assigned STF sequence and the assigned CEF sequence. The method also includes transmitting the wireless packet over a transmission link.

In any of the preceding aspects/embodiments, the set of at least four different component sequences may include at least one of sequence $Gc_{128}$ or sequence $Gd_{128}$ wherein:

The Sequence $Gc_{128}$, from left to right, up to down, has binary values:

+1 −1 −1 +1 −1 +1 −1 +1 −1 −1 −1 −1 +1 +1 −1 −1 +1 −1 −1 +1 +1 −1 +1 −1 −1 −1 −1 −1 −1 +1 +1
−1 +1 +1 −1 +1 −1 +1 −1 +1 +1 +1 +1 −1 −1 +1 +1 +1 −1 −1 +1 +1 −1 +1 −1 −1 −1 −1 −1 −1 +1 +1
−1 +1 +1 −1 +1 −1 +1 −1 +1 +1 +1 +1 −1 −1 +1 +1 −1 +1 +1 −1 −1 +1 −1 +1 +1 +1 +1 +1 +1 −1 −1
−1 +1 +1 −1 +1 −1 +1 −1 +1 +1 +1 +1 −1 −1 +1 +1 −1 +1 +1 −1 −1 +1 −1 +1 −1 −1 −1 −1 −1 +1 +1

The Sequence $Gd_{128}$ from left to right, up to down, has binary values:

+1 −1 −1 +1 −1 +1 −1 +1 −1 −1 −1 −1 +1 +1 −1 −1 +1 −1 −1 +1 +1 −1 +1 −1 −1 −1 −1 −1 −1 +1 +1
−1 +1 +1 −1 +1 −1 +1 +1 +1 +1 −1 −1 +1 +1 +1 −1 −1 +1 +1 +1 −1 +1 −1 −1 −1 −1 −1 −1 +1 +1
+1 −1 −1 +1 −1 +1 −1 −1 −1 −1 +1 +1 −1 −1 −1 −1 +1 +1 −1 −1 −1 −1 −1 −1 +1 +1
+1 −1 −1 +1 −1 +1 −1 −1 −1 −1 +1 +1 −1 −1 −1 +1 +1 −1 −1 +1 −1 +1 +1 +1 +1 +1 +1 −1 −1

In any of the preceding aspects/embodiments, the set of at least four different component sequences may include both of the sequences $Gc_{128}$ and $Gd_{128}$.

In any of the preceding aspects/embodiments, the set of at least four different component sequences may include sequence $Ga_{128}$ and sequence $Gb_{128}$, wherein:

The Sequence $Ga_{128}$, from left to right, up to down, has binary values:

+1 +1 −1 −1 −1 −1 −1 −1 −1 +1 −1 +1 +1 −1 −1 +1 +1 +1 −1 −1 +1 +1 +1 +1 −1 +1 −1 +1 −1 +1 +1 −1
−1 −1 +1 +1 +1 +1 +1 +1 −1 +1 −1 +1 +1 −1 +1 +1 −1 −1 +1 +1 +1 +1 −1 +1 −1 +1 −1 +1 +1 −1
+1 +1 −1 −1 −1 −1 −1 −1 +1 −1 +1 −1 −1 +1 +1 −1 −1 +1 +1 +1 +1 −1 +1 −1 +1 −1 +1 +1 −1
+1 +1 −1 −1 −1 −1 −1 −1 +1 −1 +1 +1 −1 −1 +1 −1 −1 +1 +1 −1 −1 −1 −1 +1 −1 +1 −1 +1 −1 −1 +1

The Sequence $Gb_{128}$ from left to right, up to down, has binary values:

−1 −1 +1 +1 +1 +1 +1 +1 −1 +1 −1 +1 +1 −1 −1 −1 +1 +1 −1 −1 −1 −1 +1 −1 +1 −1 +1 −1 −1 +1
+1 +1 −1 −1 −1 −1 −1 −1 +1 −1 +1 +1 −1 −1 +1 −1 −1 −1 −1 +1 −1 +1 −1 +1 −1 −1 +1
+1 +1 −1 −1 −1 −1 −1 −1 +1 −1 +1 −1 −1 +1 +1 −1 −1 +1 +1 +1 +1 −1 +1 −1 +1 −1 +1 +1 −1
+1 +1 −1 −1 −1 −1 −1 −1 +1 −1 +1 +1 −1 −1 +1 −1 −1 −1 −1 +1 −1 +1 −1 +1 −1 −1 +1

In any of the preceding aspects/embodiments, the method may also include: receiving, from a network controller, an indication of the assigned STF sequence and the assigned CEF sequence.

In any of the preceding aspects/embodiments, the method may also include: transmitting, to the network controller, information regarding measured co-channel interference conditions. The assigned STF sequence and assigned CEF sequence may be assigned by the network controller based on the information regarding measured co-channel interference conditions.

In any of the preceding aspects/embodiments, the method may also include: storing a plurality of assigned STF sequences and a plurality of assigned CEF sequences, wherein each assigned STF sequence and each assigned CEF sequence is assigned to a respective transmission link; and determining which of the plurality of assigned STF sequences and which of the plurality of assigned CEF sequences to use for generating the wireless packet, depending on at least one of the transmission link.

In some aspects, the present disclosure describes a device in a millimeter-wave (mmWave) wireless communication network. The device includes: a receiver for receiving a wireless packet over a target link; a memory; and a processor coupled to the receiver and the memory. The processor is configured to execute instructions to cause the device to receive a wireless packet including a received short training field (STF) and a received channel estimation field (CEF). The instructions also cause the device to determine whether the received STF matches an assigned STF assigned for a target link for the receiver, by performing cross-correlation between the STF and at least one component sequence from a set of at least four different component sequences, the set of at least four different component sequences being a set of pairs of Golay sequences, and comparing an output of the cross-correlation with an expected output, wherein when the received STF matches the assigned STF, the wireless packet is determined to be a target packet for the target link for the receiver. The instructions also cause the device to perform a channel estimation by performing a cross-correlation of the received CEF with an assigned CEF assigned for the target link for the receiver, the assigned CEF being assigned from a set of two or more CEFs, each CEF in the set of CEFs being formed using one or more sequences from the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ. The instructions also cause the device to demodulate or ignore a remaining portion of the wireless packet, based on whether the wireless packet is a target packet.

The instructions may cause the device to perform any of the aspects/embodiments described above.

In some aspects, the present disclosure describes a device in a millimeter-wave (mmWave) wireless communication network. The device includes: a transmitter for transmitting a wireless packet over a transmission link; a memory; and a processor coupled to the receiver and the memory. The processor is configured to execute instructions to cause the device to store at least one assigned short training field (STF) sequence and at least one assigned channel estimation field (CEF) sequence. The assigned STF sequence is formed from one component sequence of a set of at least four different component sequences, the set of at least four different component sequences being a set of pairs of Golay sequences. The assigned CEF sequence is from a set of two or more CEFs, each CEF in the set of CEFs being formed from one or more sequences of the set of component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ. The instructions also cause the device to generate a wireless packet including the assigned STF sequence and the assigned CEF sequence. The instructions also cause the device to transmit the wireless packet over a transmission link.

The instructions may cause the device to perform any of the aspects/embodiments described above.

BRIEF DESCRIPTION OF THE DRAWINGS

Reference will now be made, by way of example, to the accompanying drawings which show example embodiments of the present application, and in which:

FIG. 2 is a diagram of an example packet;

FIG. 3A shows a $Ga_{128}$ preamble component sequence;

FIG. 3B shows a $Gb_{128}$ preamble component sequence;

FIG. 4A is a diagram of an 801.11ad non-control STF sequence;

FIG. 4B is a diagram of an 102.11ad control STF sequence;

FIG. 4C is a diagram of an 802.11ad CEF sequence;

FIG. 6A shows a $Gc_{128}$ preamble component sequence, according to example embodiments;

FIG. 6B shows a $Gd_{128}$ preamble component sequence, according to example embodiments;

FIG. 7A is a diagram of the autocorrelation properties of the $Gc_{128}$ preamble component sequence;

FIG. 7B is a diagram of the autocorrelation properties of the $Gd_{128}$ preamble component sequence;

FIG. 8 is a diagram of a EDMG CEF sequence according to an example embodiment;

FIG. 9A is a diagram of the autocorrelation properties of the CEF sequence of FIG. 8;

FIG. 9B is a diagram of the cross-correlation properties of the CEF sequences of FIG. 4C and FIG. 8;

FIG. 10A is a diagram of a non-control EDMG STF sequence according to an example embodiment;

FIG. 10B is a diagram of a control EDMG STF sequence according to an example embodiment;

FIG. 18 is a diagram of a set of EDMG CEF sequences according to example embodiments;

FIG. 22 is a diagram of a further set of EDMG CEF sequences according to example embodiments;

Similar reference numerals may have been used in different figures to denote similar components.

DESCRIPTION OF EXAMPLE EMBODIMENTS

The making and using of example embodiments of this disclosure are discussed in detail below. It should be appreciated, however, that the concepts disclosed herein can be embodied in a wide variety of specific contexts, and that the specific embodiments discussed herein are merely illustrative.

Figure 1:
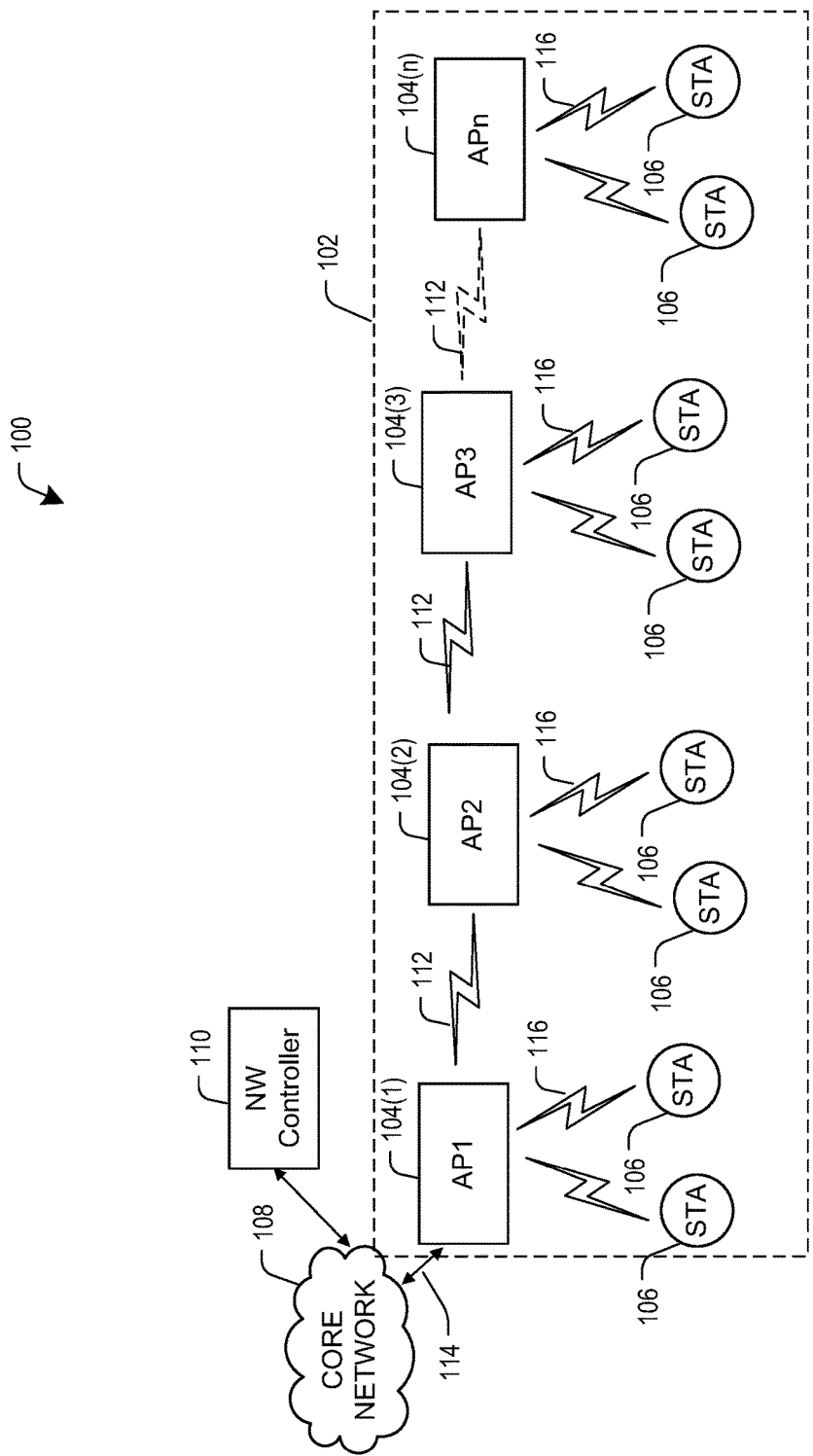
FIG. 1 is a diagram of an example wireless communications network in accordance with embodiments of the present disclosure.

FIG. 1 illustrates an example communications network 100 in which example embodiments of the systems and methods described herein may be applied. The network 100 includes a plurality of access points AP1 104(1) to APn 104(n) (generically referred to herein as APs 104 or AP 104) each having a respective coverage area that services a plurality of stations (STAs) 106, and a core network 108. In the illustrated embodiment, APs 104 are configured to form mmWave distribution network 102. In mmWave distribution network 102, one or more of the APs 104 are connected by a communication link 114 to a backhaul core network 108. In the example of FIG. 1, communication link 114 is a wired connection (for example a fiber or coax cable connection), although in some embodiments communication link 114 can be a wireless radio frequency (RF) link. At least some of the APs 104 of the mmWave distribution network 102 exchange signals through respective communication channels 112, which in the example of FIG. 1 are wireless RF links. Furthermore, each AP 104 is enabled to establish uplink and/or downlink connections with the STAs 106 within the AP's coverage area through respective RF channels 116 that serve to carry data from the AP 104 to the STAs 106 and vice-versa.

In at least some examples embodiments, beam forming is performed on transmitted and/or received signals at APs 104 and STAs 106 to facilitate the simultaneous use of common frequency spectrums within small geographic areas.

Data carried over the uplink/downlink RF channels 116 may include data communicated to/from a remote-end (not shown) by way of the backhaul core network 108 via the APs 104. In the mmWave distribution network 102 illustrated in FIG. 1, AP1 104(1) has direct wired communications link 114 to the core network 108, and the remaining APs 104(2) to 104(n) communicate through wireless RF channels 112 directly or indirectly with AP1 104(1). Thus, in some examples AP1 104(1) provides a gateway node data uplink/downlink connection between the core network 108 and at least some of the other APs 104.

As used herein, the term "access point" (AP) refers to any component (or collection of components) configured to provide wireless access in a network, such as an evolved NodeB (eNB), a macro-cell, a femtocell, a Wi-Fi AP, or other wirelessly enabled devices. In mmWave distribution network 102, the APs 104 function as distribution nodes (DNs) that provide wireless access in accordance with one or more wireless communication protocols, e.g., Long Term Evolution (LTE), LTE advanced (LTE-A), High Speed Packet Access (HSPA), Wi-Fi 802.11a/b/g/n/ac/ad, etc. In at least some example embodiments the APs 104 are stationary devices fixed within a geographic region.

As used herein, the term "station" (STA) refers to any component (or collection of components) capable of establishing a wireless connection with an access point, such as a client node (CN), user equipment (UE), a mobile station (STA), and other wirelessly enabled electronic devices (EDs). In some embodiments, the network 100 may comprise various other wireless devices, such as relays, low power nodes, etc. In example embodiments, the core network 108 includes a network (NW) controller 110 that performs network management functions such as interference management and traffic management and engineering in respect of the mmWave distribution network 102.

In at least some examples, the methods and systems disclosed herein introduce new training signals that may help reduce co-channel interference between communication channels 112, 116 and/or between communication channels 112 that share the same time duration and the same spectrum. In at least some examples, these training signals are used to allow APs 104 and/or STAs 106 to detect potential co-channel interference due to spatial sharing in the mmWave network 102, to estimate the channel of a target link and an interfering link, and/or to mitigate the co-channel interference.

In example embodiments, a packet format is proposed for an EDMG WLAN, for example 802.11ay, for use over communication channels 112 and 116. In example embodiments, the proposed format builds on and is backwards compatible with the IEEE 802.11ad specification. For explanatory purposes, the packet preamble sequence specified in 802.11ad is described in the following paragraphs with reference to FIGS. 2 to 5E.

As known in the art, Physical Layer Convergence Protocol (PLCP) Protocol Data Units (PPDUs) are units of data transmitted over the physical (PHY) layer of a network, e.g., Layer 1 of the Open Systems Interconnection (OSI) model. PPDUs are structured data units that include information such as address information, protocol-control information, and/or user data. The packet structure of a PPDU typically includes a short training field (STF), channel estimation field (CEF), header field, and data payload. Some PPDUs may also include a legacy DMG header (L-Header) field and an EDMG header (EDMG-Header) field.

FIG. 2 is a diagram of a packet 200, which may be a PPDU. The packet 200 may be a wireless PHY packet, and may be a control or non-control packet. Control PHY packets typically carry control information in their payloads, and non-control PHY packets typically carry data in their payloads. Non-control PHY packets may be transmitted using various waveforms, such as single carrier (SC) waveforms and orthogonal frequency-division multiplexed (OFDM) waveforms. A receiver (for example AP 104 or STA 106) may need to determine whether the packet 200 is a non-control or control PHY packet upon receiving the packet 200.

The packet 200 includes an STF 202, a CEF 204, a header 206, a payload 208, and training fields 210. It should be appreciated that the packet 200 could include other fields. The STF 202 and the CEF 204 are used to send training signals and are commonly referred to in combination as a packet preamble 212. In some embodiments, the STF 202 is used to differentiate whether the packet 200 is a control or non-control PHY packet, and, as will be explained in greater detail below, to identify interfering packets that are received through an interfering channel.

The CEF 204 is used for channel estimation.

The header 206 may contain indicators or parameters that allow the receiver to decode the payload 208. In some embodiments, the header 206 may be used to determine whether the packet is an 802.11ad PHY packet or an 802.11ay PHY packet.

The payload 208 contains information (e.g., data) carried by the packet 200. The training fields 210 may include other fields such as automatic gain control (AGC) and training (TRN) subfields appended to the packet 200 for beam refinement.

FIGS. 3A and 3B show preamble component sequences for PHY packets. The preamble component sequences are bipolar-based Golay complementary sequences having a length of 128 binary values or bits. The preamble component sequences shown in FIG. 3A-B are referred to by IEEE 802.11ad as $Ga_{128}$ and $Gb_{128}$, respectively. The sequences $Ga_{128}$ and $Gb_{128}$ are Golay sequences that form a complementary pair, and the subscript indicates the sequence length of 128. The preamble component sequences $Ga_{128}$ and $Gb_{128}$ may be transmitted as binary phase-shift keyed (BPSK) symbols, such that the values are represented by points at 0 degrees and 180 degrees on the unit circle, i.e., each symbol has a modulated value of either 1 or −1. The preamble component sequences $Ga_{128}$ and $Gb_{128}$ may be transmitted in the STF and CEF of a PHY packet, such as the STF 202 and CEF 204 of packet 200.

FIGS. 4A and 4B are diagrams of a non-control STF sequence 400 and a control STF sequence 450, respectively, which are included in an 802.11ad packet preamble 212. The non-control STF sequence 400 and the control STF sequence 450 each include repeated sequences 402, 452 and a termination sequence 404, 454. The control STF sequence 450 further includes a cyclic prefix sequence 456 after the termination sequence 454.

The repeated sequences 402, 452 are multiple repetitions of the preamble component sequences $Ga_{128}$ and $Gb_{128}$. In an example embodiment, the type and quantities of sequences in the repeated sequences 402, 452 may be different between the non-control STF sequence 400 and a control STF sequence 450 so that a receiver may distinguish a non-control 802.11ad PHY packet from a control 802.11ad PHY packet. For example, the repeated sequence 402 may be 16 repetitions of the preamble component sequence $Ga_{128}$, and the repeated sequence 452 may be 48 repetitions of the preamble component sequence $Gb_{128}$.

The termination sequences 404, 454 occur at the end of the repetition portion of the non-control STF sequence 400 and the control STF sequence 450, respectively, and thus mark the end of the non-control STF sequence 400 and the control STF sequence 450. As discussed above, an STF sequence may include different values and have different lengths for a non-control or control PHY packet. As such, the termination sequences 404, 454 are predetermined sequences that indicate the end of an STF sequence. The termination sequences 404, 454 are negative instances of the preamble component sequence used in the repeated sequence 402, 452, e.g., where each symbol in the termination sequences 404, 454 is multiplied by −1. For example, when the repeated sequence 452 is several repetitions of the preamble component sequence $Gb_{128}$, then the termination sequence 454 is a negated preamble component sequence $-Gb_{128}$. Accordingly, the preamble component sequences $-Ga_{128}$ and $-Gb_{128}$ may be chosen, respectively, for the termination sequences 404, 454.

The prefix sequence 456 occurs after the termination sequence 454 in the control STF sequence 450. The prefix sequence 456 is a preamble component sequence $-Ga_{128}$ and is used as the cyclic prefix for the CEF 204. The termination sequence 404 of the non-control STF sequence 400 also functions as a prefix sequence for the CEF 204, because the termination sequence 404 is also the preamble component sequence $-Ga_{128}$.

FIG. 4C is a diagram of a CEF sequence 460 that can be included in the CEF 204 of an 802.11ad packet preamble. The CEF sequence 460 includes two concatenated sequences, labelled as $Gu_{512}$, $Gv_{512}$, that collectively include a total of 8 Golay sequences, and a termination sequence $Gv_{128}$. The first concatenated sequence $Gu_{512}$ includes 512 symbols formed from a concatenation of the 4 sequences: $-Gb_{128}$, $-Ga_{128}$, $Gb_{128}$, and $-Ga_{128}$. The second sequence $Gv_{512}$ includes 512 symbols formed from a concatenation of the 4 sequences: $-Gb_{128}$, $Ga_{128}$, $-Gb_{128}$, and $-Ga_{128}$. Accordingly, the polarity of the middle two Golay sequences are switched between the first concatenated sequence $Gu_{512}$ and the second concatenated sequence $Gv_{512}$. The termination sequence $Gv_{128}$ includes 128 symbols and is a copy of the sequence $-Gb_{128}$.

Figures 5A, 5B:
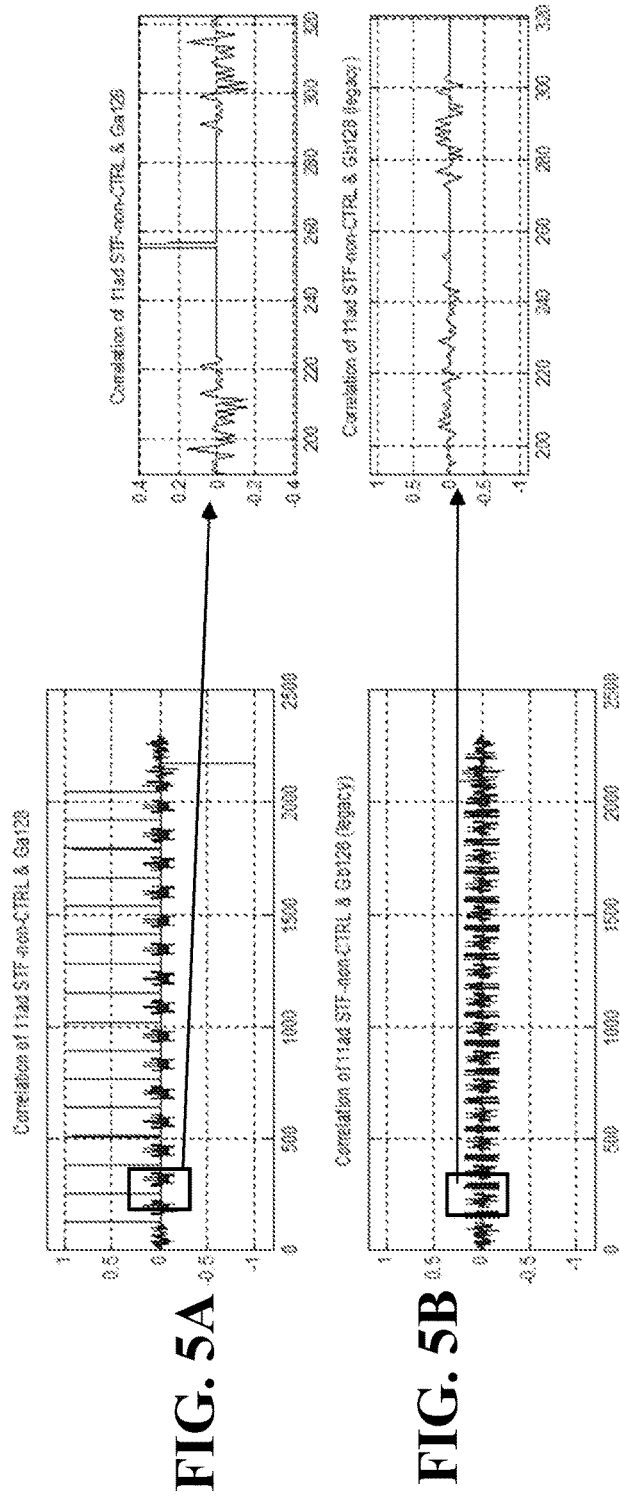
FIG. 5A is a diagram of the correlation properties of the non-control STF sequence of FIG. 4A with the $Ga_{128}$ preamble component sequence of FIG. 3A.
FIG. 5B is a diagram of the correlation properties of the non-control STF sequence of FIG. 4A with the $Gb_{128}$ preamble component sequence of FIG. 3B.

FIGS. 5A and 5B are diagrams of correlation properties of the non-control STF sequence 400 and the control STF sequence 450 with the preamble component sequences $Ga_{128}$ and $Gb_{128}$, respectively. A receiver may perform cross-correlation to determine whether a received sequence matches a known sequence. For example, a receiver may cross-correlate a received STF with the preamble component sequences $Ga_{128}$ and $Gb_{128}$ to determine which preamble component sequence is carried within the STF.

As shown in FIG. 5A, when the non-control STF sequence 400 is correlated with the preamble component sequence $Ga_{128}$, 16 positive impulses and one negative impulse are generated. The 16 positive impulses correspond to correlation peaks with the 16 positive repetitions of the preamble component sequence $Ga_{128}$ in the sequence 402, and the negative impulse corresponds to correlation peaks with the negative instance of the preamble component sequence $Ga_{128}$ in the termination sequence 406. The produced impulses are normalized to have a unit maximum magnitude, e.g., a maximum magnitude of 1 or −1. As shown in FIG. 5B, when the non-control STF sequence 400 is correlated with the preamble component sequence $Gb_{128}$, no significant correlation peaks are generated. Some noise may be generated, but the magnitude of the noise may not be large enough to register as a correlation peak. As shown in FIGS. 5A and 5B, although the magnitude of the noise is low, there is still an appreciable amount of noise present even when no correlation peak is generated. Accordingly, by cross-correlating an STF in a received packet with both of the preamble component sequences $Ga_{128}$ and $Gb_{128}$, a receiver may be able to determine whether or not the packet is a non-control 802.11ad packet.

Figures 5C, 5D:
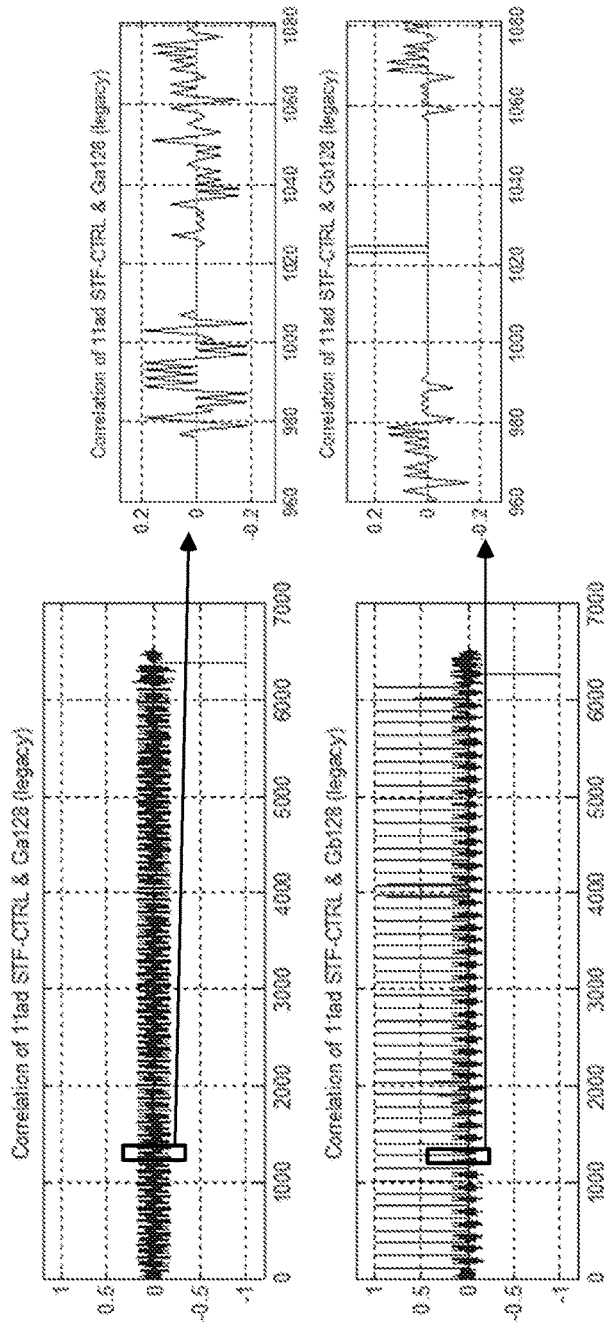
FIG. 5C is a diagram of the correlation properties of the control STF sequence of FIG. 4B with the $Ga_{128}$ preamble component sequence of FIG. 3A.
FIG. 5D is a diagram of the correlation properties of the control STF sequence of FIG. 4B with the $Gb_{128}$ preamble component sequence of FIG. 3B.

FIGS. 5C and 5D are diagrams of correlation properties of the control STF sequence 450 with the preamble component sequences $Ga_{128}$ and $Gb_{128}$, respectively. As shown in FIG. 5C, when the control STF sequence 450 is correlated with the preamble component sequence $Ga_{128}$, one negative cross-correlation peak is generated. This is because, as shown above, the control STF sequence 450 contains one negative instance of the preamble component sequence $Ga_{128}$. As shown in FIG. 5D, when the control STF sequence 450 is correlated with the preamble component sequence $Gb_{128}$, 48 positive impulses and one negative impulse are generated. These impulses correspond to the 48 positive repetitions of the preamble component sequence $Gb_{128}$ in the sequence 452 and the one negative instance of the preamble component sequence $Gb_{128}$ in the prefix sequence 456. Accordingly, by cross-correlating an STF in a received packet with both of the preamble component sequences $Ga_{128}$ and $Gb_{128}$, a receiver may be able to determine whether or not the packet is an 802.11ad control packet.

Figure 5E:
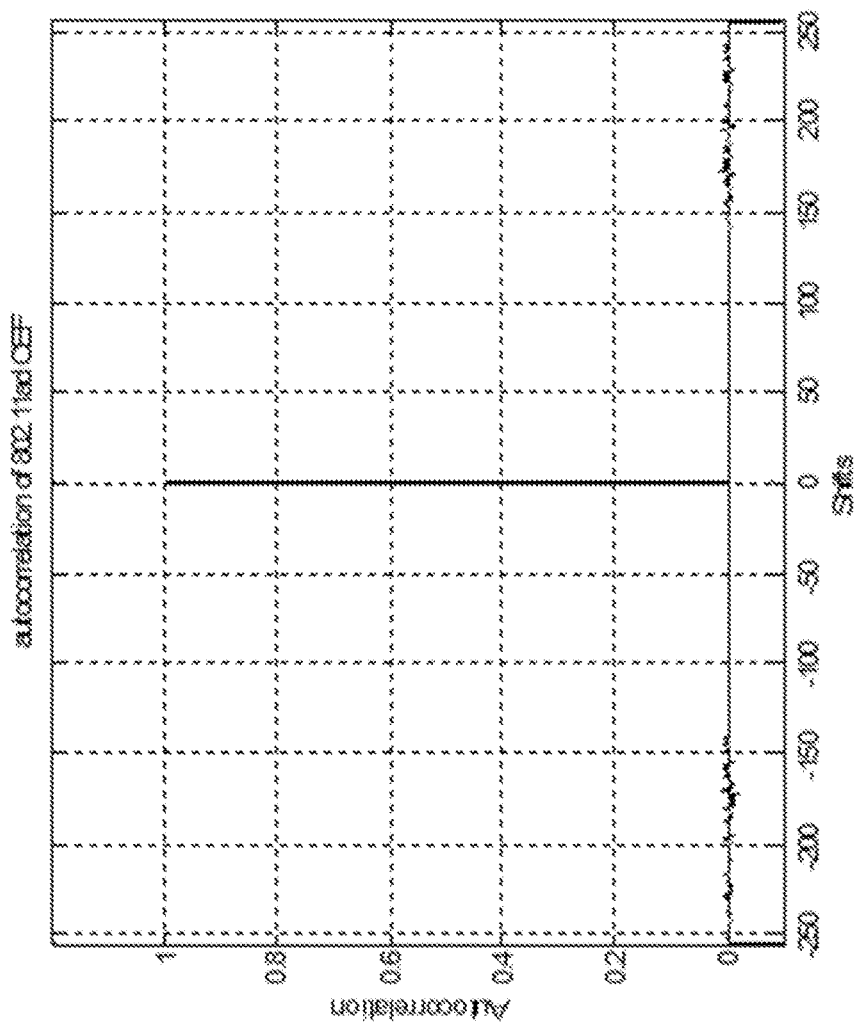
FIG. 5E is a diagram of the autocorrelation properties of the CEF sequence of FIG. 4C.

As noted above, the CEF 204 is used for channel estimation. FIG. 5E is a diagram of the periodic auto-correlation of the CEF 204. The periodic autocorrelation of the CEF 204 is a delta function for the shifts within [−128, 128], which can be used to estimate a channel with a delay spread up to 128*0.57 ns=72.7 ns (in the case where 802.11ad SC chip time is 0.57 ns). The results of the channel estimation may be used to improve beam forming operations and other noise reduction operations and to perform detection on a received signal.

Figures 6A, 6B:
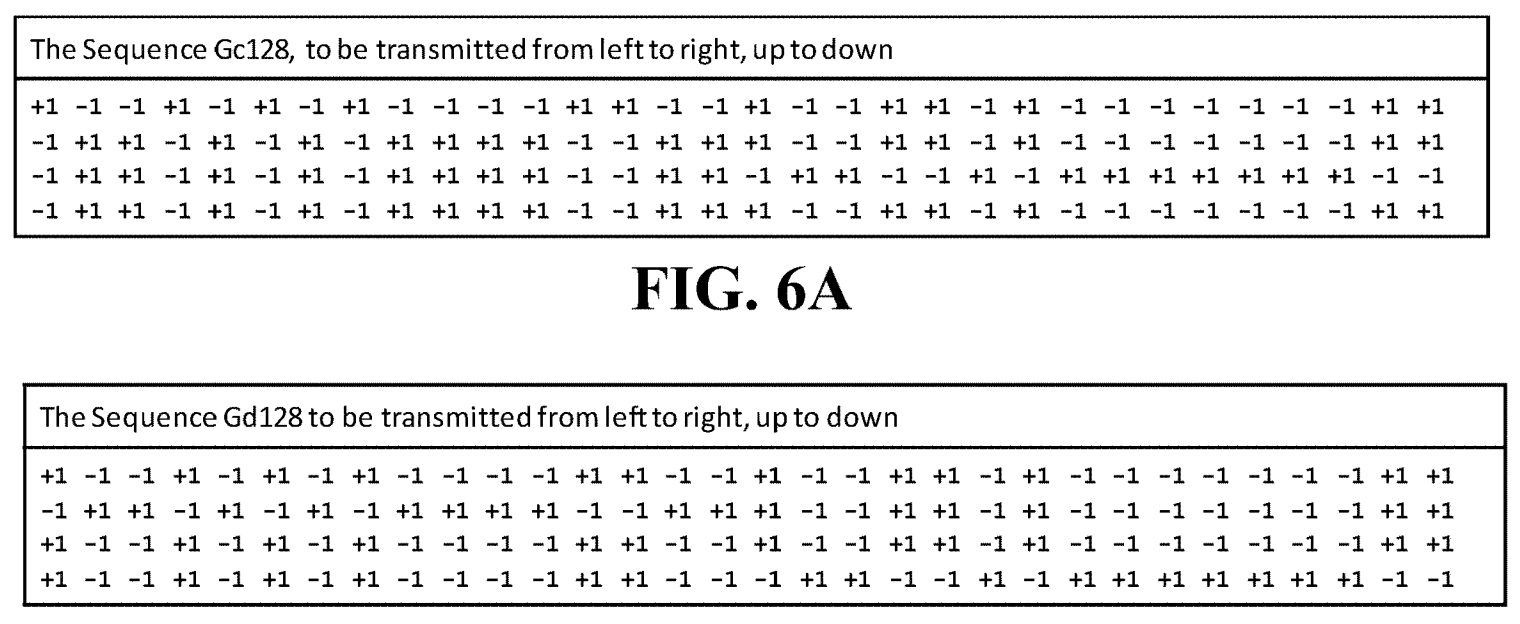

In example embodiments, as will now be described in the context of FIG. 6A and following, additional STF and CEF sequences are introduced for use in a packet preamble in addition to the 802.11ad sequences described above. These additional packet preamble sequences can be used to mitigate against inter-node and intra-node co-channel interference in a network such as the mmWave network 102 of FIG. 1. In this regard, two additional Golay sequences are introduced for use in the STF 202 and CEF 204 fields of a packet 200. As known in the art, if two sequences "A" and "B" are a complementary pair, other complementary pairs can be generated by reversing the sequence symbol order of either sequence "A" or "B", implying that reversing both sequences "A" and "B" can yield a further pair of complementary sequences. Accordingly, in an example embodiments, a third Golay sequence $Gc_{128}$ is obtained by reversing the symbols from the Golay sequence $Ga_{128}$, and a fourth Golay sequence $Gd_{128}$ is obtained by reversing the symbols from the Golay sequence $Gb_{128}$. FIGS. 6A and 6B show the bipolar-based Golay complementary sequence pair $Gc_{128}$ and $Gd_{128}$ respectively, each having a length of 128 symbols. Sequences $Gc_{128}$ and $Gd_{128}$ may be binary phase-shift keyed (BPSK), such that they are located at 0 degrees and 180 degrees on the unit circle, e.g., each symbol has a modulated value of either 1 or −1.

Figure 7C:
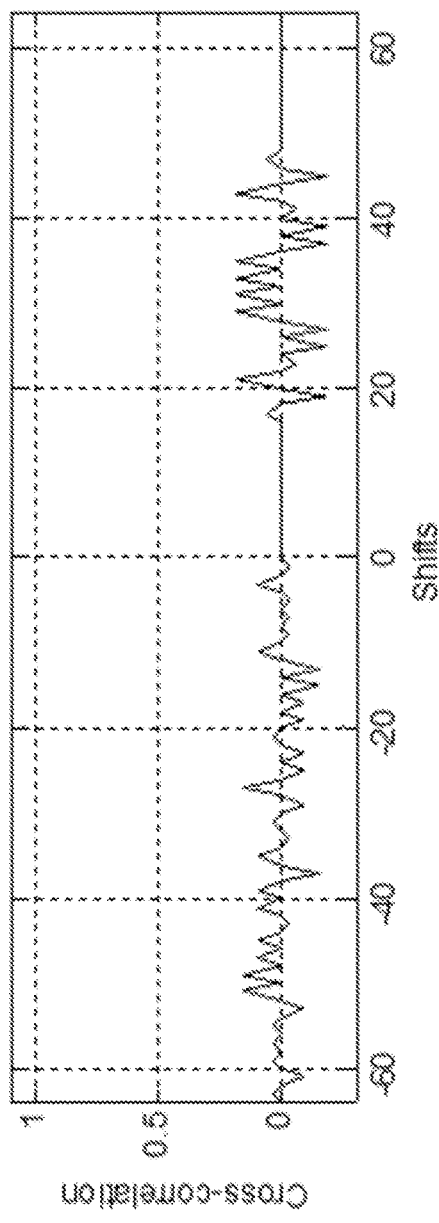
FIG. 7C is a diagram of the cross-correlation properties of the $Ga_{128}$ and $Gb_{128}$ preamble component sequences.
Figure 7D:
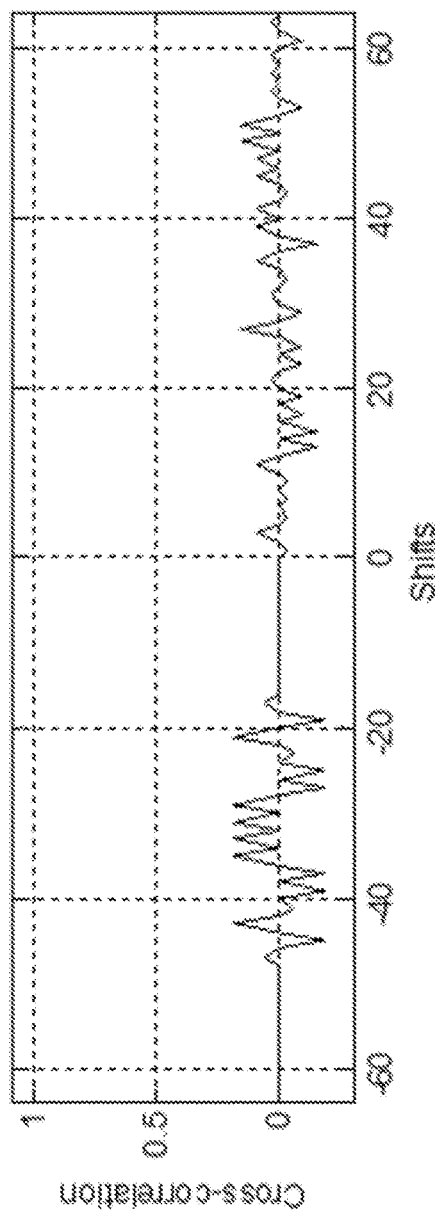
FIG. 7D is a diagram of the cross-correlation properties of the $Gc_{128}$ and $Gd_{128}$ preamble component sequences.
Figure 7E:
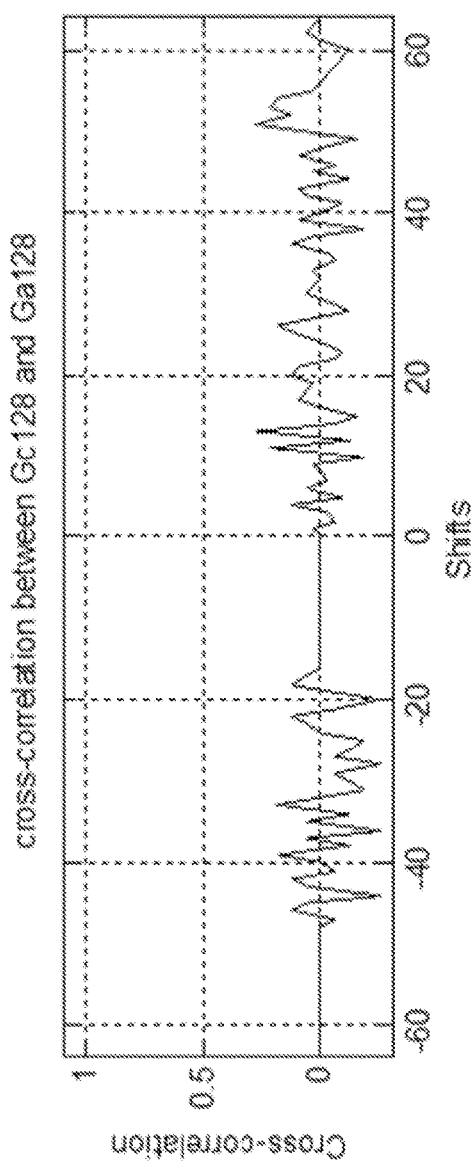
FIG. 7E is a diagram of the cross-correlation properties of the $Gc_{128}$ and $Ga_{128}$ preamble component sequences.
Figure 7F:
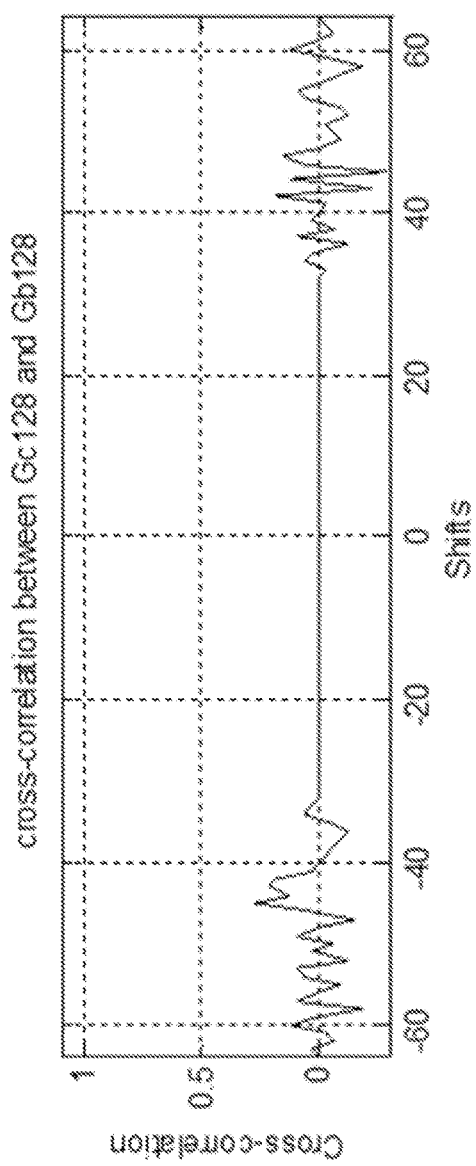
FIG. 7F is a diagram of the cross-correlation properties of the $Gc_{128}$ and $Gb_{128}$ preamble component sequences.
Figure 7G:
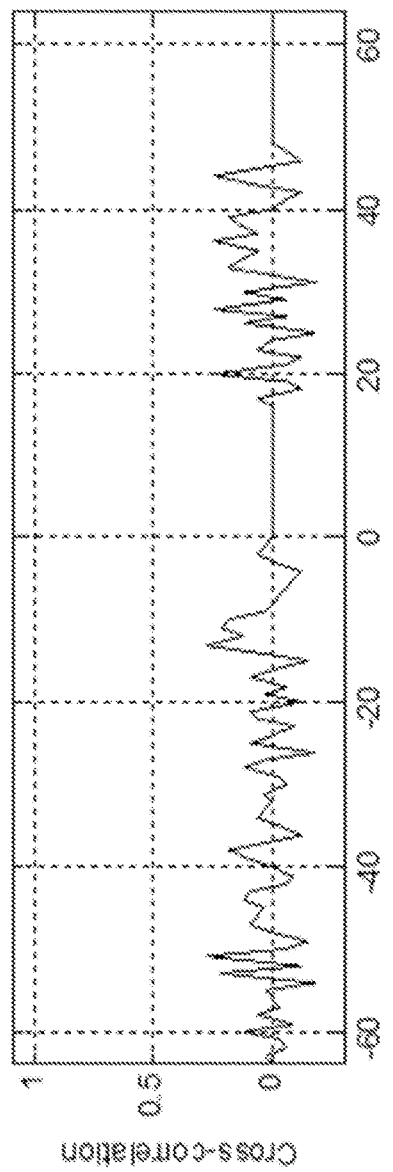
FIG. 7G is a diagram of the cross-correlation properties of the $Gd_{128}$ and $Gb_{128}$ preamble component sequences.
Figure 7H:
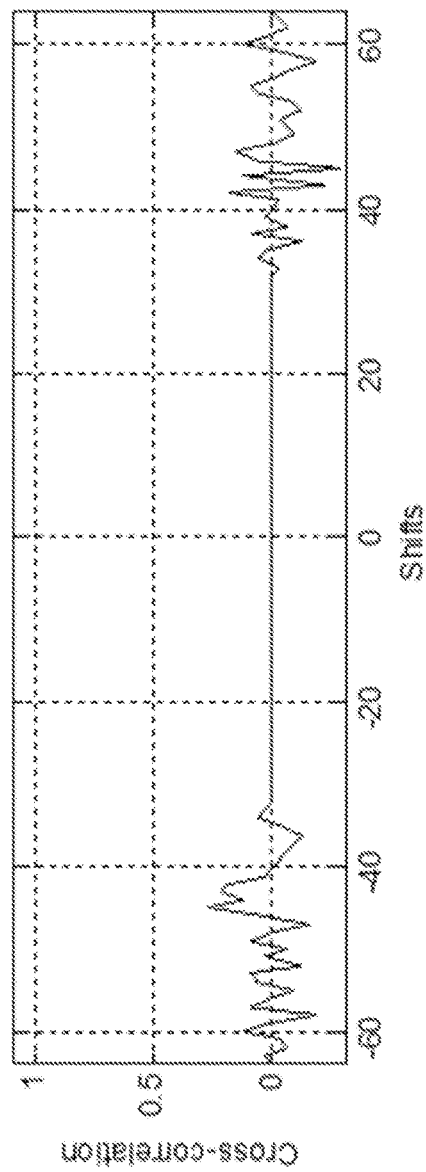
FIG. 7H is a diagram of the cross-correlation properties of the $Gd_{128}$ and $Ga_{128}$ preamble component sequences.

The sequences $Ga_{128}$, $Gb_{128}$, $Gc_{128}$ and $Gd_{128}$ provide a component sequence set in which each of the sequences are complementary with each other. In this regard: FIG. 7A is a diagram of the auto-correlation of $Gc_{128}$; FIG. 7B is a diagram of the auto-correlation of $Gd_{128}$; FIG. 7C is a diagram of the cross-correlation of $Ga_{128}$ and $Gb_{128}$; FIG. 7D is a diagram of the cross-correlation of $Gc_{128}$ and $Gd_{128}$; FIG. 7E is a diagram of the cross-correlation of $Gc_{128}$ and $Ga_{128}$; FIG. 7F is a diagram of the cross-correlation of $Gc_{128}$ and $Gb_{128}$; FIG. 7G is a diagram of the cross-correlation of $Gd_{128}$ and $Gb_{128}$; FIG. 7H is a diagram of the cross-correlation of $Gd_{128}$ and $Ga_{128}$. A delta function with a peak at 0 shifts is present in the auto-correlations of FIGS. 7A and 7B, and a zero correlation zone (ZCZ) is present in the cross-correlations of each of FIGS. 7C to 7H.

Although a set of four specific complementary Golay sequences $Ga_{128}$, $Gb_{128}$, $Gc_{128}$, $Gd_{128}$ are presented in this disclosure for use as the component sequences for packet preamble sequences, in other example embodiments additional sequences can be added and one or more of the complementary sequences could be replaced with different complementary sequences, so long as all of the complementary sequences included in the set provide a ZCZ when cross-correlated with each other and a delta function peak when auto-correlated.

As noted above, the additional sequences $Gc_{128}$ and $Gd_{128}$ are introduced for use in the STF 202 and CEF 204 fields of a packet 200 to reduce co-channel interference. In the present description, "target channel" is used to refer to an intended communication channel to a receiver, and "interfering channel" is used to refer to an unintended communication channel to a receiver. Additionally, from the perspective of a receiver device, "target data packets" refer to data packets that are intended for that receiver through a target channel, and "interfering data packets" refer to data packets that are not intended for that particular receiver. As will be explained below, some nodes (for example some APs 104 and STAs 106) may be multiple input-multiple output (MIMO) enabled, in which case a single node can implement multiple receiver functionality, with each receiver function having a respective directional orientation.

The new STF sequences are provided to allow a receiver to detect co-channel interference, and the new CEF sequence allows a receiver to then estimate the interfering channel and the target channel, thereby enabling the receiver to take action to mitigate the co-channel interference. In this regard, FIG. 8 is a diagram of a new CEF sequence, namely CEF-1 860, for use in the CEF field 204 of packet 200. In the illustrated embodiment, CEF-1 sequence 860 is obtained by modifying CEF sequence 460 to replace each occurrence of $Gb_{128}$ with $-Gc_{128}$ and each occurrence of $Ga_{128}$ with $Gd_{128}$. As shown in FIG. 8, CEF-1 sequence 860 includes two concatenated sequences, labelled as Gu-$1_{512}$, Gv-$1_{512}$, that collectively include a total of 8 Golay sequences, and a cyclic postfix sequence Gv-$1_{128}$. The first concatenated sequence Gu-$1_{512}$ includes 512 symbols formed from a concatenation of the 4 sequences: $Gc_{128}$, $-Gd_{128}$, $-Gc_{128}$, and $-Gd_{128}$. The second sequence Gv-$1_{512}$ includes 512 symbols formed from a concatenation of the 4 sequences: $Gc_{128}$, $Gd_{128}$, $Gc_{128}$, and $-Gd_{128}$. Accordingly, the polarities of the middle two Golay sequences are switched between the first concatenated sequence Gu-$1_{512}$ and the second concatenated sequence Gv-$1_{512}$. The cyclic postfix sequence Gv-$1_{128}$ includes 128 symbols and is a copy of the sequence $Gc_{128}$.

FIG. 9A is a diagram of the auto-correlation of CEF-1 sequence 860, showing a delta function for shifts within [−128, 128], with a spike at 0, and FIG. 9B is a diagram of the cross-correlation of CEF sequence 460 and CEF-1 sequence 860, showing a zero-correlation zone (ZCZ) for shifts within [−128, 128]. CEF sequence 460 and CEF-1 sequence 860 are orthogonal to each other for shifts within [−128, 128]. Accordingly, CEF-1 sequence 860 is designed to have a ZCZ property with CEF sequence 460 to generate a ZCZ set of two sequences.

The CEF-1 sequence 860 is combined with new STF sequences to provide new packet preamble sequences for use in packet preamble 212 of an 802.11ay compliant packet. FIG. 10A is a diagram of a new non-control packet preamble sequence 1001 that includes a new non-control STF sequence 1000. FIG. 10B is a diagram of a new control packet preamble sequence 1051 that includes a new control STF sequence 1050. The non-control STF sequence 1000 and the control STF sequence 1050 each include repeated sequences 1002, 1052 and a termination sequence 1004, 1054. The control STF sequence 1050 further includes a postfix sequence 1056 after the termination sequence 1054. Both of the new preamble sequences 1001 and 1051 shown in FIGS. 10A and 10B include the new CEF-1 sequence 860 sequence in the CEF 204.

The repeated sequences 1002, 1052 are multiple repetitions of the preamble component sequences $Gd_{128}$ and $Gc_{128}$, respectively. In an example embodiment, the type and quantities of sequences in the repeated sequences 1002, 1052 may be different between the non-control STF sequence 1000 and a control STF sequence 1050 so that a receiver may distinguish a non-control 802.11ay PHY packet from a control 802.11ay PHY packet. For example, the repeated sequence 1002 may be 16 repetitions of the preamble component sequence $Gd_{128}$, and the repeated sequence 1052 may be 48 repetitions of the preamble component sequence $Gc_{128}$.

The termination sequences 1004, 1054 occur at the end of the repetition portion of the non-control STF sequence 1000 and the control STF sequence 1050, respectively, and thus mark the end of the non-control STF sequence 1000 and the control STF sequence 1050. As discussed above, an STF may include different values and have different lengths for a non-control or control PHY packet. As such, the termination sequences 1004, 1054 are predetermined sequences that indicate the end of an STF sequence. The termination sequences 1004, 1054 are negative instances of the preamble component sequence used in the repeated sequence 1002, 1052, e.g., where each symbol in the termination sequences 1004, 1054 is multiplied by −1. The prefix sequence 1056

($-Gd_{128}$) occurs after the termination sequence 1054 in the control STF sequence 1050 and is used as the cyclic prefix for the CEF 204 (which is populated with the CEF-1 sequence 860). The termination sequence 1004 of the non-control STF sequence 1000 also functions as a prefix sequence for the CEF 204, because the termination sequence 1004 is also the preamble component sequence $-Gd_{128}$.

FIGS. 11A, 11B, 11C and 11D are diagrams of correlation properties of the non-control STF sequence 1000 with the preamble component sequences $Gc_{128}$, $Gd_{128}$, $Ga_{128}$ and $Gb_{128}$, respectively. A receiver may perform cross-correlation to determine whether a received sequence matches a known sequence. For example, a receiver may cross-correlate a received STF sequence 1000 with the preamble component sequences $Gc_{128}$, $Gd_{128}$, $Ga_{128}$ and $Gb_{128}$ to determine which preamble component sequence is carried within the packet and if the packet is a non-control packet.

Figure 11C:
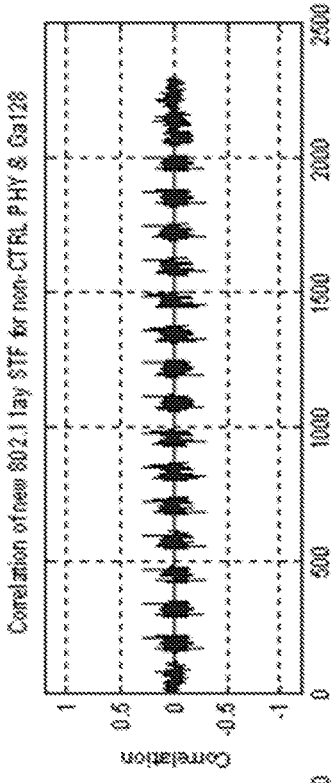
FIG. 11C is a diagram of the correlation properties of the non-control EDMG STF sequence of FIG. 10A with the $Ga_{128}$ preamble component sequence of FIG. 3A.
Figure 11D:
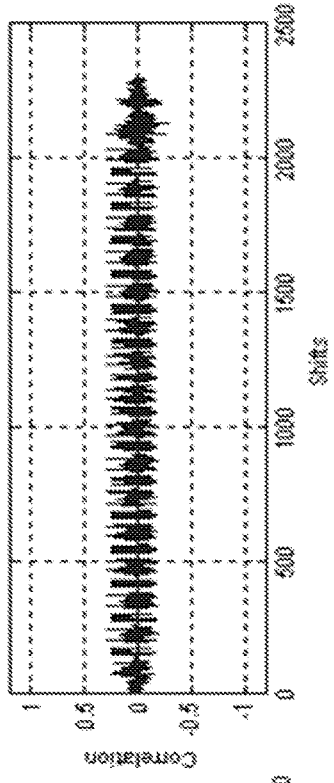
FIG. 11D is a diagram of the correlation properties of the non-control EDMG STF sequence of FIG. 10A with the $Gb_{128}$ preamble component sequence of FIG. 3B.
Figure 11A:
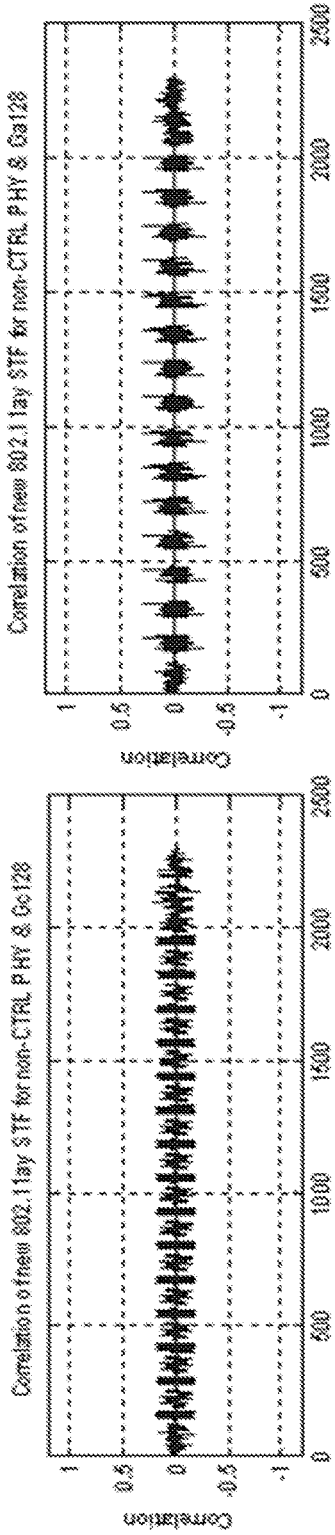
FIG. 11A is a diagram of the correlation properties of the non-control EDMG STF sequence of FIG. 10A with the $Gc_{128}$ preamble component sequence of FIG. 6A.
Figure 11B:
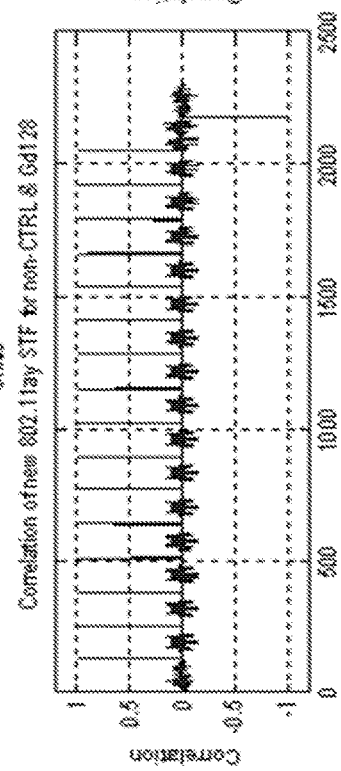
FIG. 11B is a diagram of the correlation properties of the non-control EDMG STF sequence of FIG. 10A with the $Gd_{128}$ preamble component sequence of FIG. 6B.

As shown in FIG. 11B, when the non-control STF sequence 1000 is correlated with the preamble component sequence $Gd_{128}$, 16 positive impulses and one negative impulse are generated. The 16 positive impulses correspond to correlation peaks with the 16 positive repetitions of the preamble component sequence $Gd_{128}$ in the sequence 1002, and the negative impulse corresponds to a correlation peak with the negative instance of the preamble component sequence $Gd_{128}$ in the termination sequence 1004. The produced impulses are normalized to have a unit maximum magnitude, i.e., a maximum magnitude of 1 or −1. As shown in FIGS. 11A, 11C, and 11D, when the non-control STF sequence 1000 is correlated with any of the preamble component sequences $Gc_{128}$, $Ga_{128}$, or $Gb_{128}$, no significant correlation peaks are generated. Some noise may be generated, but the magnitude of the noise may not be large enough to register as a correlation peak. As shown in FIGS. 11A-11D, although the magnitude of the noise is low, there is still an appreciable amount of noise present even when no correlation peak is generated. Accordingly, cross-correlating an STF in a received packet with all of the preamble component sequences $Gc_{128}$, $Gd_{128}$, $Ga_{128}$ and $Gb_{128}$, a receiver can determine which peaks correspond to correlation peaks and which peaks correspond to noise peaks. Using this information, a receiver can determine if a received packet is intended for the receiver, whether the packet is a non-control packet or a control packet, and which of the four STF sequences the packet contains. In particular, in the illustrated example the magnitude of any peaks in FIGS. 11A, 11C and 11D are detectably less than the correlation peaks in FIG. 11B, and the correlation peaks in FIG. 11B are similar to that for either of the 802.11ad control STF and non-control STF with $Gb_{128}$ and $Ga_{128}$ respectively.

Figure 12A:
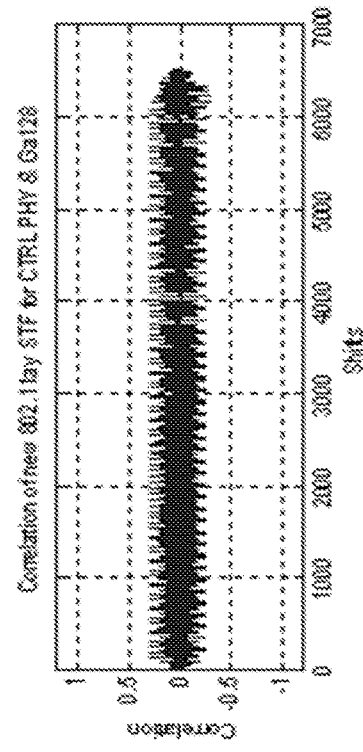
FIG. 12A is a diagram of the correlation properties of the control EDMG STF sequence of FIG. 10B with the $Gc_{128}$ preamble component sequence of FIG. 6A.
Figure 12B:
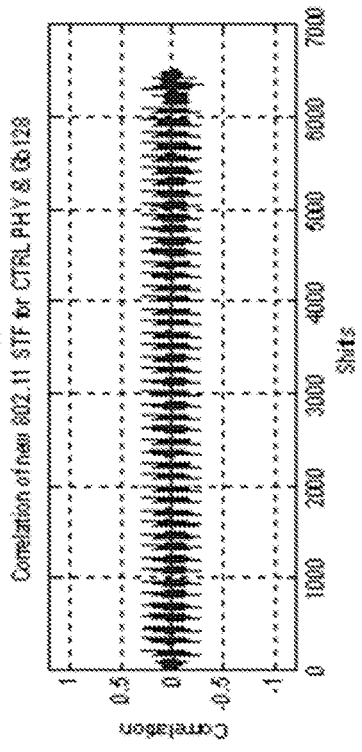
FIG. 12B is a diagram of the correlation properties of the control EDMG STF sequence of FIG. 10B with the $Gd_{128}$ preamble component sequence of FIG. 6B.
Figure 12C:
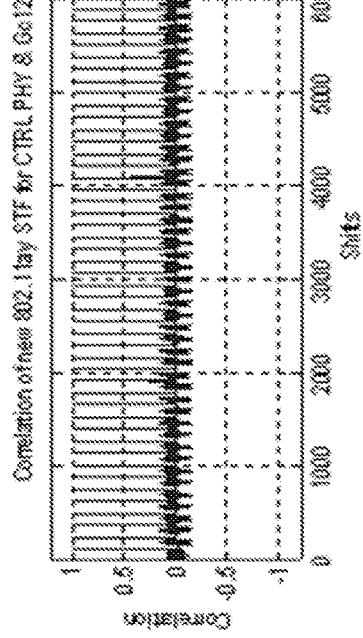
FIG. 12C is a diagram of the correlation properties of the control EDMG STF sequence of FIG. 10B with the $Ga_{128}$ preamble component sequence of FIG. 3A.
Figure 12D:
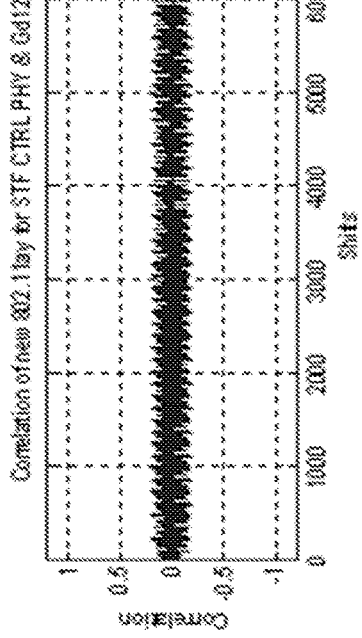
FIG. 12D is a diagram of the correlation properties of the control EDMG STF sequence of FIG. 10B with the $Gb_{128}$ preamble component sequence of FIG. 3B.

Similarly, FIGS. 12A, 12B, 12C and 12D are diagrams of correlation properties of the control STF sequence 1050 with the preamble component sequences $Gc_{128}$, $Gd_{128}$, $Ga_{128}$ and $Gb_{128}$, respectively. As shown in FIG. 12B, when the control STF sequence 1050 is correlated with the preamble component sequence $Gd_{128}$, one negative cross-correlation peak is generated. This is because, as shown above, the control STF sequence 1050 contains one negative instance of the preamble component sequence $Gd_{128}$. As shown in FIG. 12A, when the control STF sequence 1050 is correlated with the preamble component sequence $Gc_{128}$, 48 positive impulses and one negative impulse are generated. These impulses correspond to the 48 positive repetitions of the preamble component sequence $Gc_{128}$ in the sequence 1052 and the one negative instance of the preamble component sequence $Gc_{128}$ in the prefix sequence 1056. As shown in FIGS. 12C and 12D, no detectable correlation peaks are present when the control STF is correlated with either $Ga_{128}$ or $Gb_{128}$. The correlation peaks in FIG. 12A are similar to that for either of the 802.11ad control STF and non-control STF with $Gb_{128}$ and $Ga_{128}$ respectively.

Accordingly, in example embodiments, a set of four complementary Golay sequences $Gc_{128}$, $Gd_{128}$, $Ga_{128}$ and $Gb_{128}$ are used as repeated component sequences to generate a set of different sequences for use in the packet preamble 212 of a packet 200 that is transmitted in the mmWave network 10. In particular, the available packet preamble sequences include: two different non-control STF sequences (STF sequence 400 and STF sequence 1000) are available for use in the STF 202 of a non-control packet; two different STF sequences (STF sequence 450 and STF sequence 1050) are available for use in the STF 202 of a control packet; and two different CEF sequences (CEF sequence 460 and CEF-1 sequence 860) are available for use in the CEF 204 of a control or non-control packet. In example embodiments, the 802.11ad CEF sequence 460 is always combined with the 802.11ad STF sequences 400 or 450, and the presently introduced CEF-1 sequence 860 is always combined with the presently introduced STF sequences 1000 or 1050. These combinations provide a total of four sequence options for packet preamble 212, including 2 options for non-control packets and 2 options for control packets.

In the case of the STF, each of the four possible STF sequences contains a sequence of repetitions of a corresponding one of the four complementary Golay sequences $Gc_{128}$, $Gd_{128}$, $Ga_{128}$ and $Gb_{128}$. In this regard, at a receiver, each of the STF sequences will produce a predetermined threshold number of cross-correlation peaks only in respect of the Golay sequence that it contains at least the threshold number of repetitions of. This relationship can be expressed as a lookup table, as shown below in TABLE 1, which identifies each of the four available packet preamble sequence options (802.11ad is used to refer to STFs and the CEF from 802.11ad and EDMG is used to refer to STFs and CEFs that are introduced in this document):

TABLE 1

Cross correlation of received STF with Component Sequence

| STF Sequence | Component Sequence | Number of Peaks | Reference FIG. | CEF Sequence |
|---|---|---|---|---|
| STF 400 (802.11ad, non-control) | $Ga_{128}$ | 16 | 5A | CEF sequence 460 (802.11ad) |
| STF 450 (802.11ad, control) | $Gb_{128}$ | 48 | 5C | CEF sequence 460 (802.11ad) |
| STF 1000 (EDMG, non-control) | $Gd_{128}$ | 16 | 11B | CEF-1 sequence 860 (EDMG) |
| STF 1050 (EDMG, control) | $Gc_{128}$ | 48 | 12A | CEF-1 sequence 860 (EDMG) |

Table 1 also identifies the CEF sequences that are included in the packet preamble sequence with the identified STF sequences. In example embodiments, packet preamble sequence assignments are allocated among the APs 104 in mmWave network 102 to help reduce co-channel interference. In some examples, the assignments are performed by network controller 110. In some example embodiments, the packet preamble sequences are assigned based on predicted interference conditions when the APs 104 of the mmWave network 102 are positioned in their respective operating locations and configuration. In some example embodiments, the network controller 110 receives information from the APs 104 regarding measured co-channel interference conditions and then the STF and CEF sequences are assigned based on the observed co-channel interference conditions.

As shown above in Table 1, the STF sequence in a received packet can be cross-correlated with the component sequences $Ga_{128}$, $Gb_{128}$, $Gc_{128}$, $Gd_{128}$ and the number of positive peaks in the correlation result counted. Based on the count result, a receiver can determine if a received packet is a target packet or an interfering packet. In the case of a detected target packet, the receiver can estimate the target channel based on the CEF in the packet, and in the case of a detected interfering packet, the receiver can estimate the interfering channel based on the CEF in the packet. The channel estimation information can then be used by the receiver to improve receiver performance to mitigate against co-channel interference. For example, the receiver may conduct interference cancellation based on the channel estimations.

Figure 13:
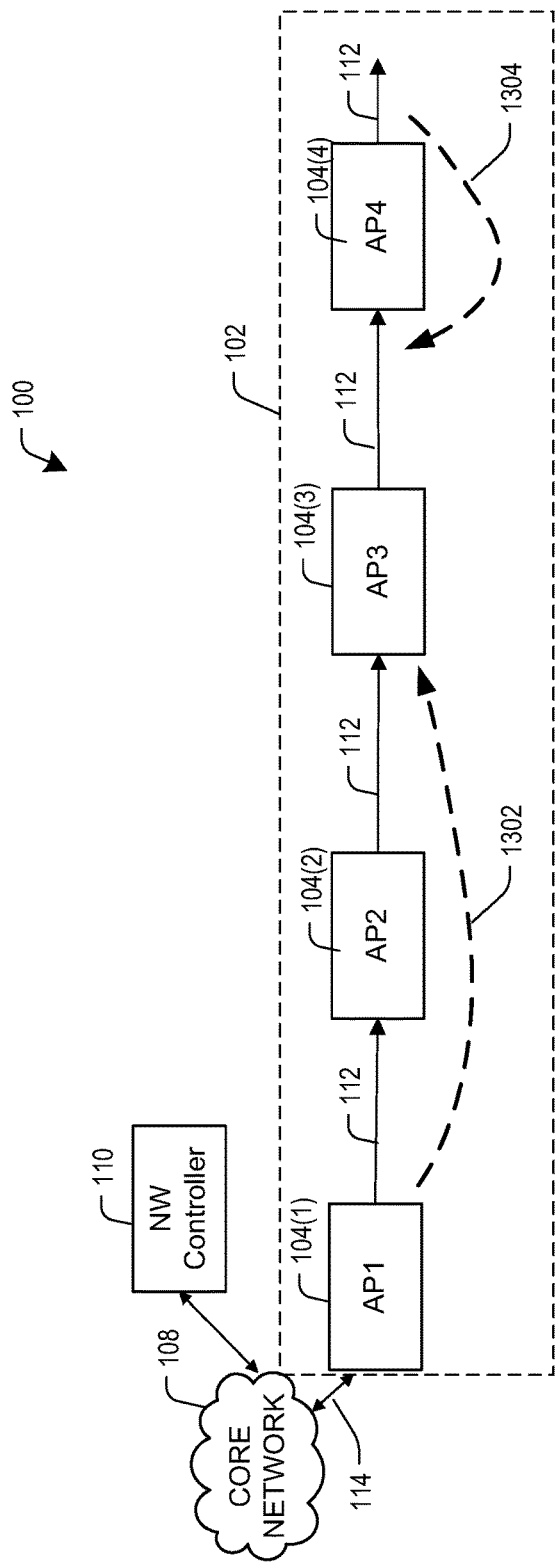
FIG. 13 is a diagram of a first use case example of a mmWave network according to example embodiments.

FIG. 13 shows an example use case (Case 1) for network 100 and mmWave network 102 in which assignment of preamble packet sequences can be used to mitigate against co-channel interference between transmitted data packets. In the example of FIG. 13, mmWave network 102 is a multi-hop network and the APs 104 are configured to function as a daisy chained set of distribution nodes (DNs) that are each capable of transmitting and receiving simultaneously, with inter-node communication channels 112 all operating using the same frequency spectrum. In the example of FIG. 13, as illustrated by the arrow heads on communication links 112, the APs 104 are each intended to receive data on a target channel from only a single upstream distribution node.

Beamforming techniques may be applied at one or both of the transmitting and receiving nodes to facilitate the simultaneous use of the same spectrum. In FIG. 13, the communication channels 112 represent the target channels, and dashed lines 1302, 1304 represent potential interfering channels. In particular, dashed line 1302 indicates a possible inter-node interference channel, illustrating that AP3 104(3) may receive target data packets from neighboring AP2 104(2) along with interfering data packets from AP1 104(1). Dashed line 1304 indicates a possible intra-node interference channel, illustrating that AP4 104(4) may receive target data packets from neighboring AP3 104(3), but can also potentially receive interfering data packets that AP4(4) itself originally transmitted to another AP.

In an example embodiment, the potential inter-node and intra-node interference is mitigated by assigning different preamble packet sequences to neighboring APs 104 such that each AP 104 receives a different preamble packet sequence for its target receive channel than its adjacent neighbor. By way of example, in the case of FIG. 13, the 802.11ad STF and CEF sequences (STF sequence 400 or 450 and CEF sequence 460) are assigned for use in packets transmitted by non-neighbor APs AP1 104(1), AP3 104(3), etc. and the EDMG STF and CEF sequences (STF sequence 1000 or 1050 and CEF-1 sequence 860) are assigned for use in packets transmitted by non-neighbor APs AP2 104(2), AP4 104(4), etc. Correspondingly, non-neighbor APs AP2 104(2) and AP4 104(4) will expect to receive 802.11ad STF and CEF sequences (STF sequence 400 or 450 and CEF sequence 460) in target receiver channels and non-neighbor APs AP1 104(1), AP4 103(3) will expect to receive EDMG STF and CEF sequences (STF sequence 1000 or 1050 and CEF-1 sequence 860) in target receiver channels.

In example embodiments the channel preamble packet sequence assignments are communicated by NW controller 110 through mmWave network 102 to each of the APs 104. Table 2 below represents the packet preamble assignments made in respect of the network of FIG. 13:

TABLE 2

Packet Preamble Assignments for Case 1 Network (FIG. 13)

| Target Channel | TX Node | RX Node | Packet Preamble - Control | Packet Preamble - Non-Control |
|---|---|---|---|---|
| AP1 to AP2 | AP1 | AP2 | STF sequence 450, CEF sequence 460 (802.11ad) | STF sequence 400, CEF sequence 460 (802.11ad) |
| AP2 to AP3 | AP2 | AP3 | STF sequence 1050, CEF-1 sequence 860 (EDMG) | STF sequence 1000, CEF-1 sequence 860 (EDMG) |
| AP3 to AP4 | AP3 | AP4 | STF sequence 450, CEF sequence 460 (802.11ad) | STF sequence 400, CEF sequence 460 (802.11ad) |
| AP4 to AP5 | AP4 | AP5 | STF sequence 1050, CEF-1 sequence 860 (EDMG, control) | STF sequence 1000, CEF-1 sequence 860 (EDMG) |

In the case of AP3 104(3), packets that it receives through its intended target channel 112 (AP2 to AP3) will have the EDMG STF and CEF sequences, and packets received through the interfering channel 1302 (which are in fact target packets for AP2 104(2)) will have the 802.11ad STF and CEF sequences. By correlating the received STFs with each of the Golay sequences $Gc_{128}$, $Gd_{128}$, $Ga_{128}$ and $Gb_{128}$, and counting the number of peaks, AP3 104(3) can determine whether a packet is a target packet or an interfering packet (and also whether it is a control or non-control packet). AP3 104(3) can then perform an auto-correlation on the data contained in the CEF field of the packet to estimate the target channel and/or the interfering channel, as the case may be.

In the case of AP4 104(4), packets that it receives through its target receiver channel 112 (AP3 to AP4) will have the 802.11ad STF and CEF sequences, and packets received through the interfering channel 1304 from its own transmitter channel will have the EDMG STF and CEF sequences, enabling AP4 104(4) to distinguish between target packets and interfering packets and also estimate the target channel and the interfering channel.

Figure 14:
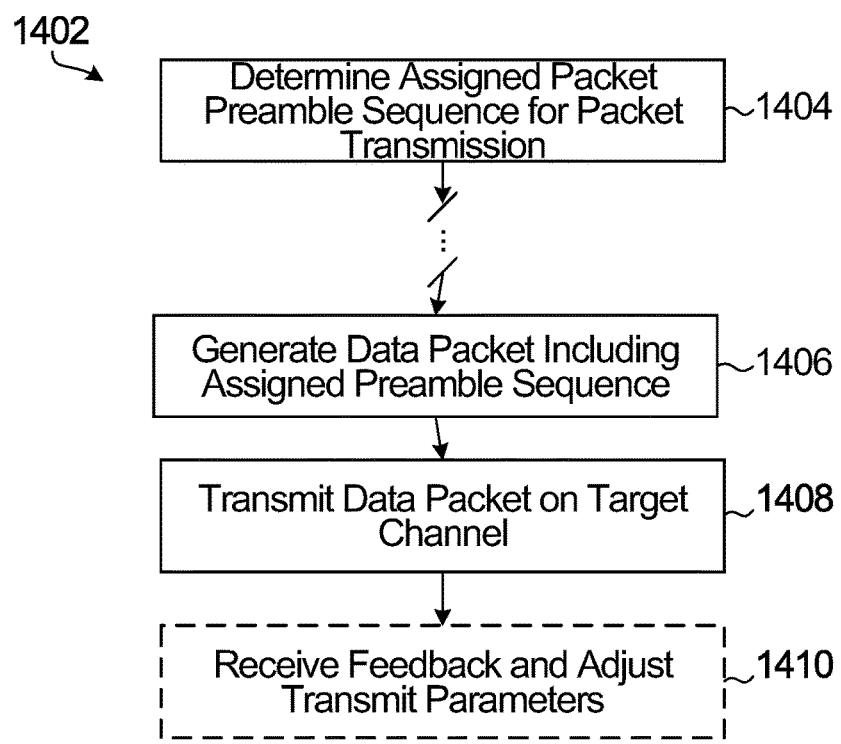
FIG. 14 is a flow diagram of a method performed at a transmitting node according to an example embodiment.

FIG. 14 is a flow diagram showing an example of a method 1402 that may be carried out by a transmitting AP 104 in the mmWave network 102 example described above in respect of FIG. 13, and FIG. 15 is a flow diagram showing an example of a method 1502 that may be carried out by a receiving AP 104 in the mmWave network 102 example described above in respect of FIG. 12. Both methods 1402 and 1502 may be carried out at each AP 104 that is enabled to both transmit and receive.

Transmitting method 1402 includes an initial step 1404 of determining what packet preamble sequence is assigned to the AP 104 to use for packet transmissions in a target channel. Determining the assigned packet preamble sequence could include receiving an assignment notification from network controller 110 indicating which of the packet preamble sequence options (e.g. 802.11ad or EDMG) the AP 104 is required to use for packet transmissions in target channel.

When the AP 104 receives data to transmit, it assembles the data into packets. As indicated in step 1406, the AP 104 includes the assigned packet preamble sequence for the target channel in the packet preamble field 212 of each packet 200. As indicated in step 1408, the AP 104 then transmits the packet on the target channel. In example embodiments, the transmitting AP 104 uses beamforming to direct the transmitted packets to a target receiver AP 104. As indicated in step 1410, in some example embodiments, the transmitting AP 104 may receive feedback (which may come directly from the receiving AP 104 or indirectly from network controller 110) that causes or enables the transmitting AP 104 to adjust one or more of its transmission parameters (for example one or more beamforming parameters) to mitigate against future co-channel interference.

Figure 15:
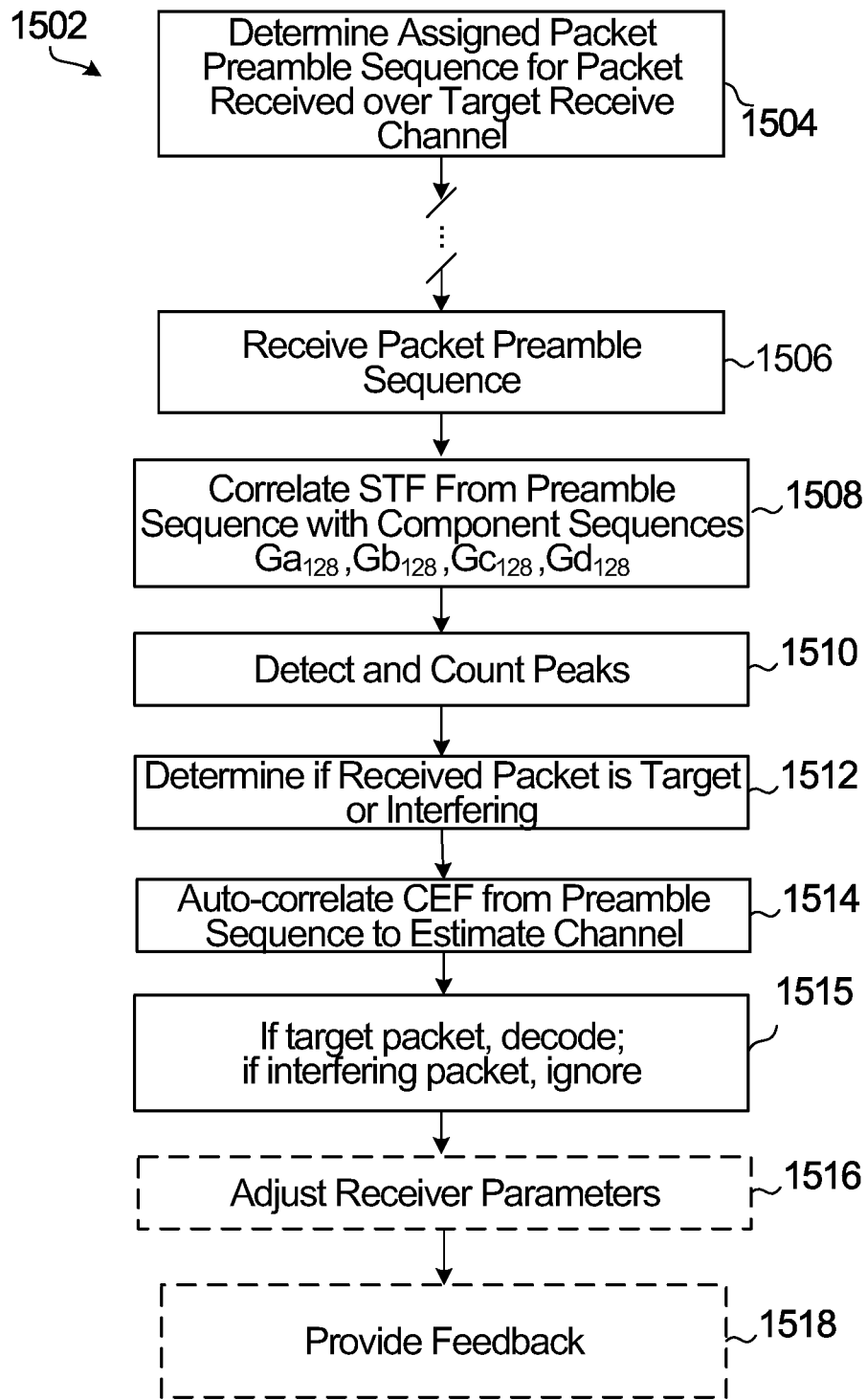
FIG. 15 is a flow diagram of a method performed at a receiver node according to an example embodiment.

Referring to FIG. 15, receiving method 1502 also includes an initial step 1504 of determining what packet preamble sequence an AP 104 should be expecting in packets that the AP 104 receives through a target channel. Determining the assigned packet preamble sequence could include receiving an assignment notification from network controller 110 indicating which of the packet preamble sequence options (e.g. 802.11ad or EDMG) the AP 104 should be expecting for packet transmissions received in a target channel. (Note that in network configurations such as that described below in respect of FIG. 16, where an AP can simultaneously receive different packets in multiple directions using the same spectrum, the assignment information may specify different packet preamble sequence options for the different receiver target channels.)

As indicated at step 1506, the AP receives, through a target channel, a packet that includes a packet preamble sequence. As indicated at step 1508, the AP 104 correlates the STF sequence contained in the received packet preamble sequence with each of the component sequences $Ga_{128}$, $Gb_{128}$, $Gc_{128}$, $Gd_{128}$. The AP 104 then detects and counts the resulting peaks for each of the correlations as indicated in step 1510. As indicated in step 1512, the correlation peak count for the STF sequence enables the AP 104 to determine if the received packet preamble corresponds to the assigned packet preamble, in which case the received packet is determined to be a target packet received through the target channel. If, however, the AP 104 determines that the received packet preamble is not the assigned packet preamble, the AP 104 determines that the received packet is an interfering packet received through a channel that is interfering with the target channel.

At indicated in step 1514, the AP 104 can then autocorrelate the CEF sequence in the received packet to get a channel estimation. If the packet is a target packet, the channel estimation provides information about the target channel, and if the packet is an interfering packet, the channel estimation provides information about the interfering channel. As indicated at step 1515, in the case where the packet is a target packet, the rest of the packet can then be decoded based on the channel estimation, and if the packet is an interfering packet the rest of the packet can be ignored or treated as interference. It is contemplated that step 1515 may alternatively be performed before step 1514.

In the case of either a target packet or an interfering packet, the channel estimation may, as indicated in step 1516, be used to adjust receiver parameters to try and improve performance of the target channel and reduce the impact of the interfering channel. The adjusted receiver parameters could include parameters for interference cancellation algorithms that are applied by the AP 104, and/or beam forming parameters. As indicated at step 1518, in some examples the receiving AP 104 may provide feedback on the target channel and/or interfering channels to the transmitting AP and/or network controller 110 to enable the transmitting AP and/or network controller to take action to reduce future co-channel interference.

Figure 16:
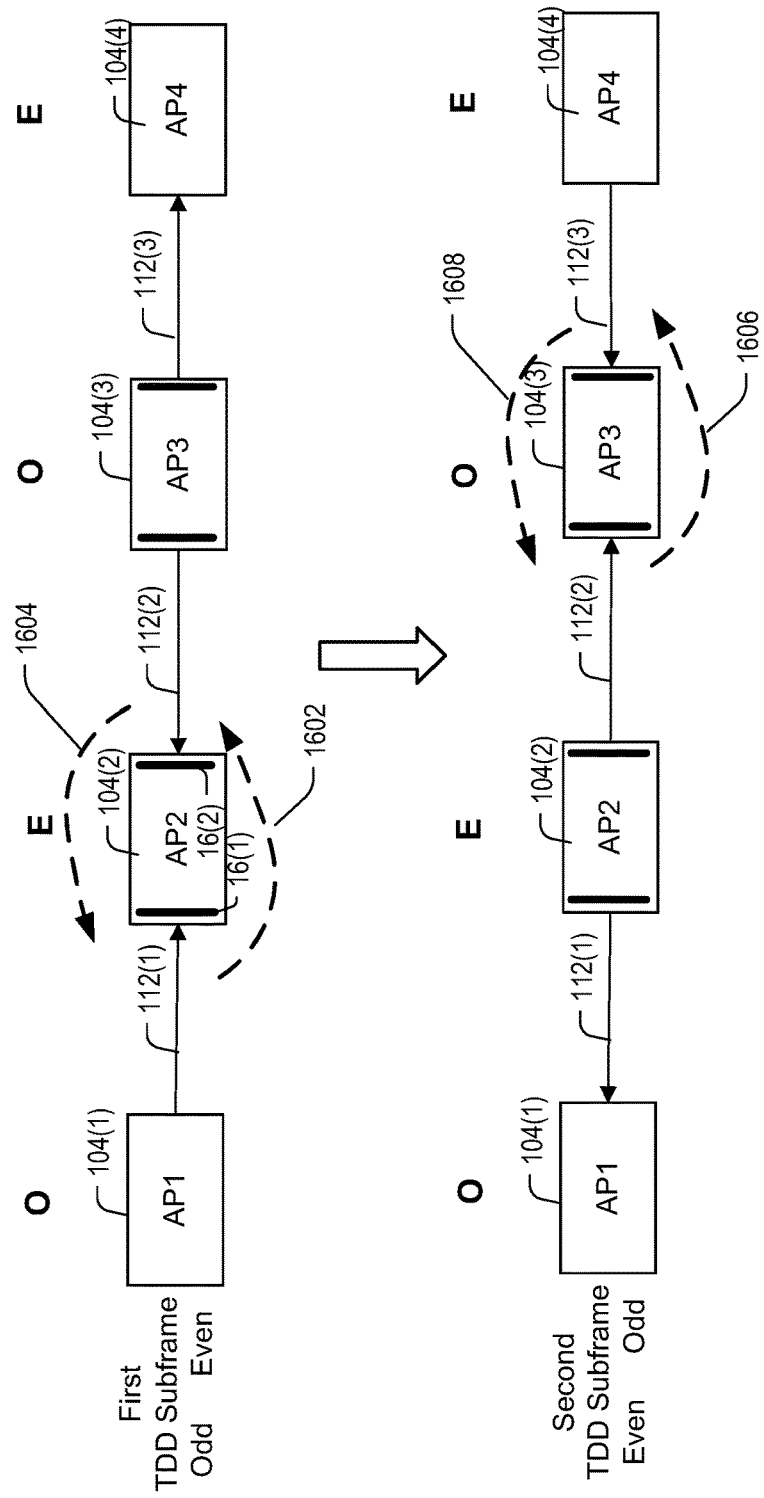
FIG. 16 is a diagram of a second use case example of a mmWave network according to example embodiments.

FIG. 16 shows a further example use case (Case 2) for mmWave network 102. In the example of FIG. 16, the APs 104 are not capable of transmitting and receiving simultaneously, but are each capable of simultaneously receiving packet streams from multiple nodes (for example, from multiple APs 104) in a first time division duplex (TDD) subframe duration and simultaneously transmitting packet streams to multiple nodes (for example, to multiple APs 104) in a second TDD subframe duration. In FIG. 16, APs 104 are designated as odd (O) or even (E), with odd APs (i.e. AP1 104(1), AP3 104(3)) being configured to transmit only in the first TDD subframe and receive only in the second TDD subframe. Conversely, even AP's (i.e. AP1 104(2), AP3 104(4)) are configured to transmit only in the second TDD subframe and receive only in the first TDD subframe. The directions of the arrows on the lines that represent RF channels 112(1), 112(2) and 112(3) in FIG. 16 illustrate that during the first TDD subframe (top) the odd (O) APs transmit only to even (E) APs, and the during the second TDD subframe (bottom) the even (E) APs transmit only to odd (O) APs. The "odd" and "even" designations can be allocated to the APs 104 by network controller 110.

In example embodiments, at least some of the APs 104 include beam forming antennas to enable the APs to simultaneously receive multiple packet streams that use the same spectrum but originate from spatially separated transmitters, and to similarly simultaneously transmit multiple packet streams that use the same spectrum but target spatially separated receivers. By way of example, first and second beam forming antennas 16(1) and 16(2) are illustrated as vertical bars in AP2 104(2) in FIG. 16.

In the illustrated example, during the first TDD subframe AP2 104(2) functions in receive-only mode and has two receiver target channels, namely channel 112(1) for receiving target packets from AP1 104(1) at antenna 16(1) and channel 112(2) for receiving target packets from AP3 104(3) at antenna 16(2). Dashed lines 1602, 1604 represent potential interfering channels. In particular, dashed line 1602 indicates a possible inter-node interference channel, illustrating that packets from AP1 104(1) intended for channel 112(1) could potentially become interfering packets for channel 112(2). Dashed line 1604 indicates a possible further inter-node interference channel, illustrating that packets from AP3 104(3) intended for channel 112(2) could potentially become interfering packets for channel 112(1).

During the second TDD subframe, AP3 104(3) functions in receive-only mode and has two receiver target channels, namely channel 112(2) for receiving target packets from AP112 104(2) at one beamforming antenna and channel 112(3) for receiving target packets from AP4 104(4) at another beamforming antenna. Dashed lines 1606, 1608 represent potential interfering channels. In particular, dashed line 1606 indicates a possible inter-node interference channel, illustrating that packets from AP2 104(2) intended for channel 112(2) could potentially become interfering packets for channel 112(3). Dashed line 1608 indicates a possible further inter-node interference channel, illustrating that packets from AP4 104(4) intended for channel 112(3) could potentially become interfering packets for channel 112(2).

In example embodiments, co-channel interference is mitigated by assigning different packet preamble sequences for use for each of the different receiver channels used by a particular AP in a sub-frame. Table 3A below represents one option for the packet preamble assignments made in respect of the network of FIG. 16 for use in the first TDD subframe, and Table 3B represents one option for the packet preamble assignments made use in the second TDD subframe.

TABLE 3A

Packet Preamble Assignments for Case 2 Network (FIG. 16):
FIRST TDD SUBFRAME

| Target Channel | TX Node | RX Node | Packet Preamble - Control | Packet Preamble - Non-Control |
|---|---|---|---|---|
| AP1 to AP2 112(1) | AP1 | AP2 | STF sequence 450, CEF sequence 460 (802.11ad, control) | STF sequence 400, CEF sequence 460 (802.11ad) |
| AP3 to AP2 112(2) | AP3 | AP2 | STF sequence 1050, CEF-1 sequence 860 (EDMG, control) | STF sequence 1000, CEF-1 sequence 860 (EDMG) |
| AP3 to AP4 112(3) | AP3 | AP4 | STF sequence 450, CEF sequence 460 (802.11ad, control) | STF sequence 400, CEF sequence 460 (802.11ad) |

TABLE 3B

Packet Preamble Assignments for Case 2 Network (FIG. 16):
SECOND TDD SUBFRAME

| Target Channel | TX Node | RX Node | Packet Preamble - Control | Packet Preamble - Non-Control |
|---|---|---|---|---|
| AP2 to AP1 112(1) | AP2 | AP1 | STF sequence 450, CEF sequence 460 (802.11ad, control) | STF sequence 400, CEF sequence 460 (802.11ad) |
| AP2 to AP3 112(2) | AP2 | AP3 | STF sequence 450, CEF sequence 460 (802.11ad, control) | STF sequence 400, CEF sequence 460 (EDMG) |
| AP4 to AP3 112(3) | AP4 | AP3 | STF sequence 1050, CEF-1 sequence 860 (EDMG, control) | STF sequence 1000, CEF-1 sequence 860 (EDMG) |

As can be noted from the packet preamble sequence assignments in Table 3A, in the case of AP2 104(2), target packets that it receives through its first receiver target channel 112(1) from AP1 104(1) will have the 802.11ad STF and CEF sequences, and interfering packets that it receives through the interfering channel 1604 (which are in fact stray packets intended for AP2 104(2)'s second receiver target channel 112(2)) will have the EDMG STF and CEF sequences. Additionally, target packets that AP2 104(2) receives through its second receiver target channel 112(2) from AP3 104(3) will have the EDMG STF and CEF sequences, and interfering packets that it receives through the interfering channel 1602 (which are in fact stray packets intended for AP2 104(2)'s first receiver target channel 112(2)) will have the 802.11ad STF and CEF sequences.

By correlating the received STFs with each of the Golay sequences $Gc_{128}$, $Gd_{128}$, $Ga_{128}$ and $Gb_{128}$, and counting the number of peaks, AP2 104(2) can determine whether a packet is a target packet or an interfering packet (and also whether it is a control or non-control packet). AP2 104(2) can then perform an auto-correlation on the data contained in the CEF field of the packet to estimate the target channel or the interfering channel, as the case may be.

In a use case such as that shown in FIG. 16 where an AP 104 can have multiple target channels, the method 1502 can be performed in respect of each target receive channel and the method 1402 can be performed in respect of each target transmit channel.

Figure 17:
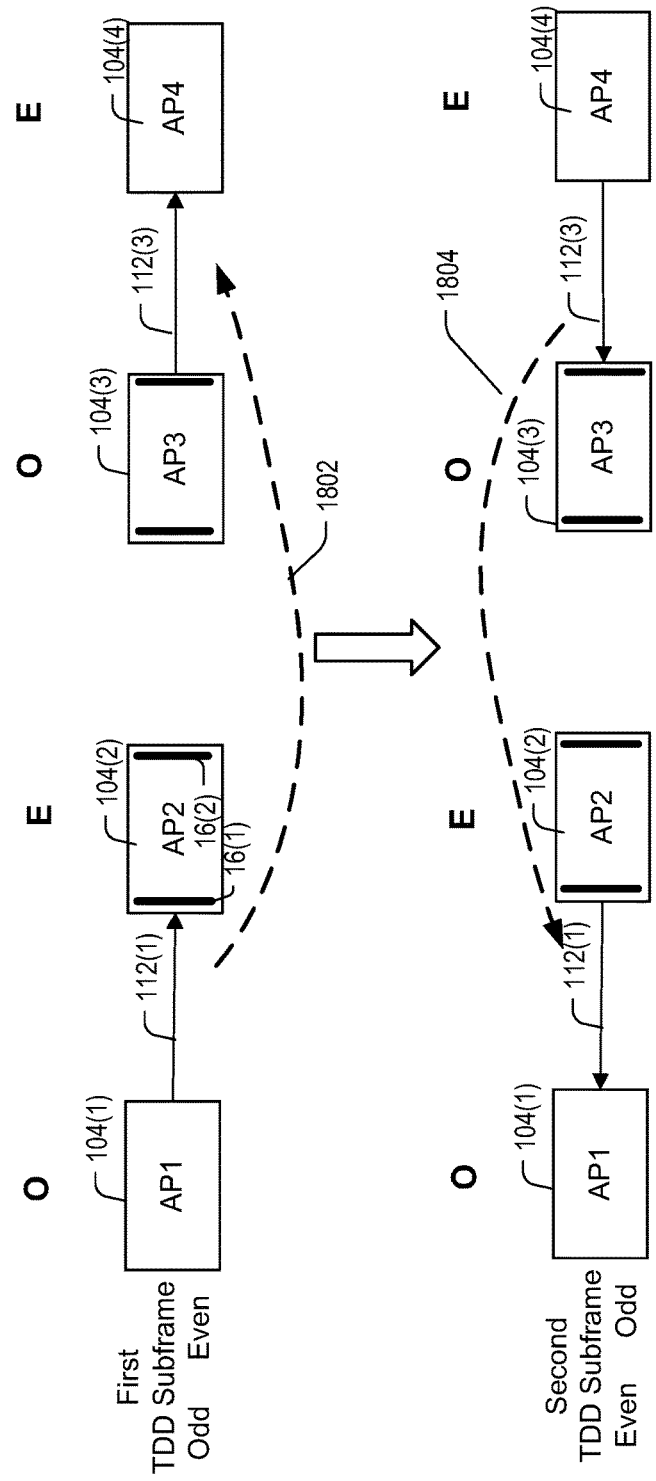
FIG. 17 is a diagram of a third use case example of a mmWave network according to example embodiments.

FIG. 17 shows a further example TDD use case (Case 3) for mmWave network 102. The example of FIG. 17 is similar to that of FIG. 16, however in the example of FIG. 17, in addition to not being capable of transmitting and receiving simultaneously, the APs 104 are also not capable of simultaneously receiving packet streams from multiple nodes.

In the illustrated example, during the first TDD subframe, AP2 104(2) functions in receive-only mode and has only one receiver target channel, namely channel 112(1) for receiving target packets from AP1 104(1). Also, during the first TDD subframe, AP4 104(4) functions in receive-only mode and has only one receiver target channel, namely channel 112(3) for receiving target packets from AP3 104(3). During the second TDD subframe, AP1 104(1) functions in receive-only mode and has only one receiver target channel, namely channel 112(1) for receiving target packets from AP2 104(1). Also, during the second TDD subframe AP3 104(3) functions in receive-only mode and has only one receiver target channel, namely channel 112(3) for receiving target packets from AP4 104(4).

Dashed lines 1802 and 1804 represent potential interfering channels. In particular, dashed line 1802 indicates a possible inter-node interference channel during the first TDD subframe, illustrating that packets from AP1 104(1) intended for channel 112(1) and receiving AP2 104(2) could potentially become interfering packets for channel 112(3) and receiving AP4 104(4). Dashed line 1804 indicates a possible inter-node interference channel during the second TDD subframe, illustrating that packets from AP4 104(4) intended for channel 112(3) could potentially become interfering packets for channel 112(1) and AP1 104(1).

In example embodiments, co-channel interference can be mitigated by assigning different packet preamble sequences to neighboring APs to use for transmissions during a TDD sub-frame. Table 4A below represents one option for the packet preamble assignments made in respect of the network of FIG. 17 for use in the first TDD subframe, and Table 4B represents one option for the packet preamble assignments made use in the second TDD subframe.

TABLE 4A

Packet Preamble Assignments for Case 3 Network (FIG. 17):
FIRST TDD SUBFRAME

| Target Channel | TX Node | RX Node | Packet Preamble - Control | Packet Preamble - Non-Control |
|---|---|---|---|---|
| AP1 to AP2 112(1) | AP1 | AP2 | STF sequence 450, CEF sequence 460 (802.11ad, control) | STF sequence 400, CEF sequence 460 (802.11ad) |
| AP3 to AP4 112(3) | AP3 | AP4 | STF sequence 1050, CEF-1 sequence 860 (EDMG, control) | STF sequence 1000, CEF-1 sequence 860 (EDMG) |

TABLE 4B

Packet Preamble Assignments for Case 3 Network (FIG. 17):
SECOND TDD SUBFRAME

| Target Channel | TX Node | RX Node | Packet Preamble - Control | Packet Preamble - Non-Control |
|---|---|---|---|---|
| AP2 to AP1 112(1) | AP2 | AP1 | STF sequence 450, CEF sequence 460 (802.11ad, control) | STF sequence 400, CEF sequence 460 (802.11ad) |
| AP4 to AP3 112(3) | AP4 | AP3 | STF sequence 1050, CEF-1 sequence 860 (EDMG, control) | STF sequence 1000, CEF-1 sequence 860 (EDMG) |

As can be noted from the packet preamble sequence assignments in Table 4A, in the case of AP4 104(4), target packets that it receives during the first TDD subframe through its receiver target channel 112(3) from AP3 104(3) will have the EDMG STF and CEF sequences, and interfering packets that it receives through the interfering channel 1802 will have the 802.11ad STF and CEF sequences. Additionally, target packets that AP1 104(1) receives through its receiver target channel 112(1) from AP2 104(2) will have the 802.11ad STF and CEF sequences, and interfering packets that it receives through the interfering channel 1804 will have the EDMG STF and CEF sequences.

Although a total of two control and two non-control packet preamble sequence options are disclosed above, in further example embodiments the set of component complementary sequences $Ga_{128}$, $Gb_{128}$, $Gc_{128}$, $Gd_{128}$ is used to construct additional preamble packet sequence options to provide additional co-channel interference reduction capabilities.

The embodiments described above provide a set of two CEF sequences (EDMG CEF-1 sequence 860 and legacy 802.11ad CEF 460) having a ZCZ property. According to example embodiments, a larger set of CEF sequences is provided. In this regard, a set 1802 of four EDMG CEF sequences are proposed as set out in FIG. 18, labelled as CEF-A, CEF-B, CEF-C and CEF-D, respectively. The sequences CEF-A, CEF-B, CEF-C and CEF-D are formed from various combinations of the component complementary sequences $Ga_{128}$, $Gb_{128}$, $Gc_{128}$, $Gd_{128}$. The sequences CEF-A, CEF-B, CEF-C and CEF-D are each configured to provide a ZCZ within the shifts of [−128, 128] when any two of the sequences are cross-correlated and a delta function within shifts of [−128, 128] with a central peak at 0 shifts when auto-correlated.

Figure 19:
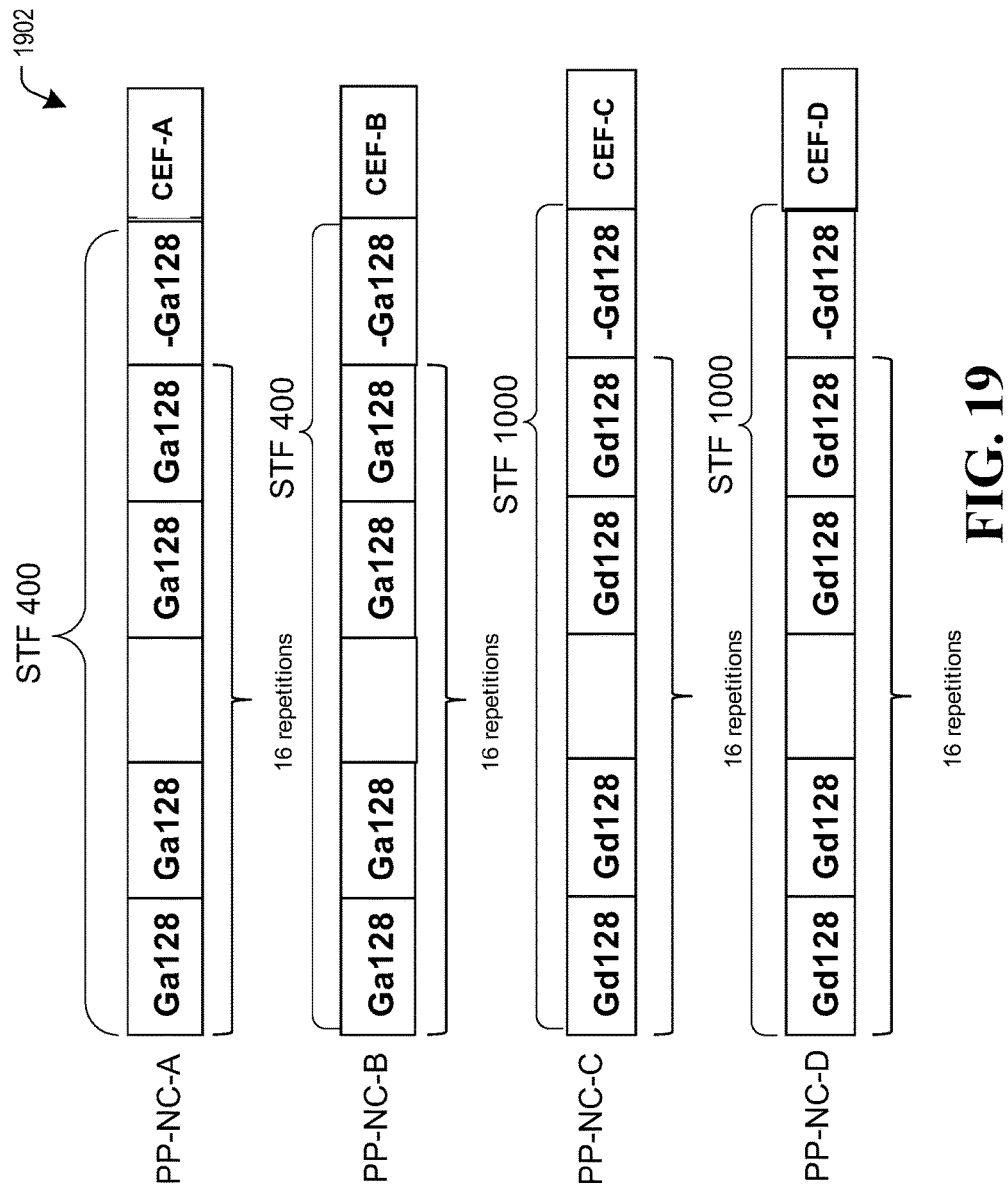
FIG. 19 is a diagram of a set of EDMG non-control packet preamble sequences according to example embodiments.

Referring to FIG. 19, in example embodiments, the new CEF sequences CEF-A, CEF-B, CEF-C and CEF-D are combined with the 802.11ad STF and EDMG non-control STF sequences STF 400 and STF 1000 disclosed above to provide a non-control packet preamble set 1902 of four EDMG non-control PHY packet preamble (PP) sequence options for use in packet field 212. In FIG. 19, the non-control packet preamble set 1902 includes four non-control PHY packet preamble (PP) sequences labelled as PP-NC-A, PP-NC-B, PP-NC-C and PP-NC-D, respectively.

Figure 20:
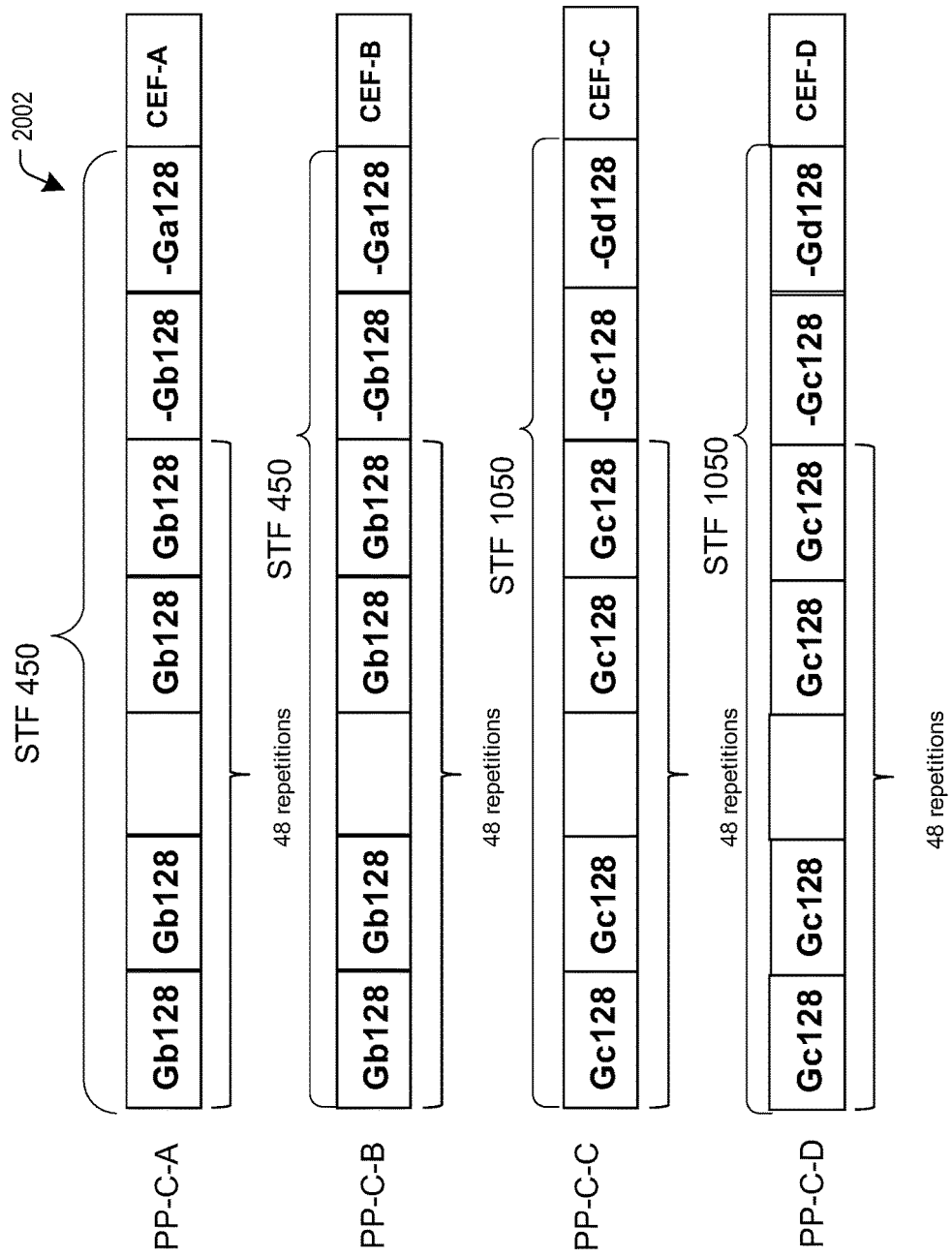
FIG. 20 is a diagram of a set of EDMG control packet preamble sequences according to example embodiments.

Referring to FIG. 20, in example embodiments, the new CEF sequences CEF-A, CEF-B, CEF-C and CEF-D are combined with the 802.11ad STF and EDMG control STF sequences STF 450 and STF 1050 disclosed above to provide a control packet preamble set 2002 of four EDMG control PHY packet preamble (PP) sequence options for use in packet field 212. In FIG. 20, the control packet preamble set 2002 includes four control PHY packet preamble (PP) sequence options labelled as PP-C-A, PP-C-B, PP-C-C and PP-C-D, respectively.

Figure 21:
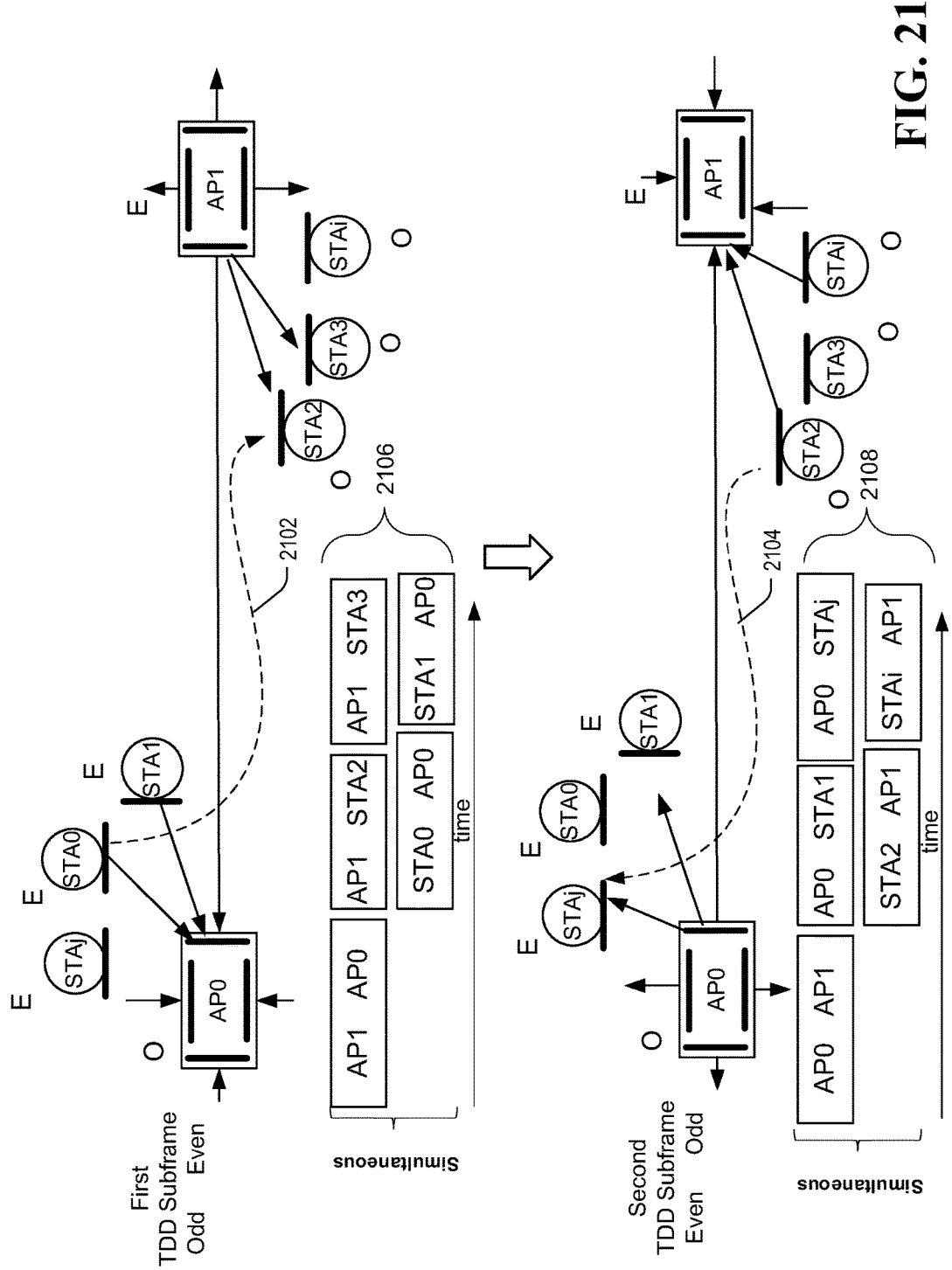
FIG. 21 is a diagram of a fourth use case example of a mmWave network according to example embodiments.

In example embodiments, the non-control packet preamble set 1902 and the control packet preamble set 2002 can be used to mitigate co-channel interference among distribution nodes such as APs 104 and client nodes such as STAs 106. In this regard, FIG. 21 shows a further example TDD use case (Case 4) for mmWave network 102. In the example of FIG. 21, AP0 is associated with STAj, STA0 and STA1, and AP1 is associated with STA2, STA3 and STAi. Furthermore, AP0 and the each of the STAs associated with AP1 (STA2, STA3, STAi) are configured to receive in the first TDD subframe, and AP1 and the each of the STAs associated with AP1 (STAj, STA0, STA1) are configured to transmit in the first TDD subframe. The reception and transmission roles are reversed in the second TDD subframe.

In the example of FIG. 21, traffic between each AP and its associated STAs and traffic between APs is coordinated to specific time-slots within each TDD subframe to reduce interference. In this regard, target channels and their respective time slots are illustrated at 2106 for a first TDD subframe and at 2108 for a second TDD subframe. However, transmissions for APs and non-associated STAs are not coordinated, which leaves open the possibility of co-channel interference occurring, as indicated for example by lines 2102 and 2104 in FIG. 21.

In order to reduce co-channel interference, packet preambles are assigned so that each distribution node AP and its associated STAs are allocated a packet preamble sequence to use for their target channels that contains an CEF sequence that has a ZCZ property with the CEF sequences used by neighboring distribution node APs and their associated STAs.

Such a channel assignment enables any AP or STA, upon receiving a packet, to conduct interference cancellation based on a channel estimation performed using the CEF sequence set. In this regard, the APs/STAs could use the method of FIG. 14 when transmitting and the method of FIG. 15 when receiving.

Referring now to FIG. 22, a further set 1202 of four EDMG CEF sequences is disclosed. Set 1202 includes sequences CEF-B and CEF-D disclosed above, and also includes newly introduced sequences CEF-E and CEF-F. The sequences CEF-E, CEF-F are also formed from various combinations of the component complementary sequences $Ga_{128}$, $Gb_{128}$, $Gc_{128}$, $Gd_{128}$. The sequences CEF-B, CEF-D, CEF-E and CEF-F are configured to provide a ZCZ within shifts of [−128, 128] when any two sequences of the set are cross-correlated and to provide a delta function within shifts of [−128, 128] when any sequence is auto-correlated.

Figure 23:
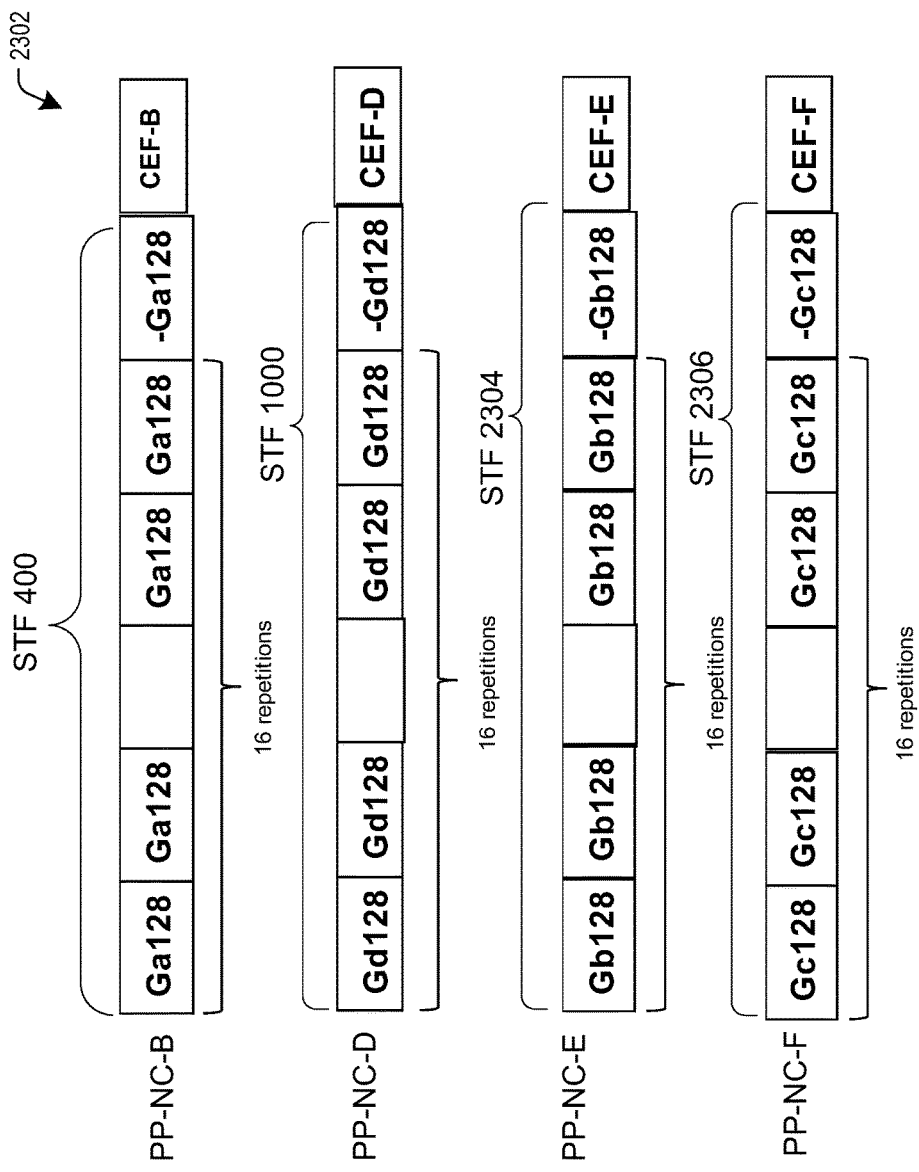
FIG. 23 is a diagram of a further set of EDMG non-control packet preamble sequences according to example embodiments.

Referring to FIG. 23, in example embodiments, the CEF sequences CEF-B, CEF-D, CEF-E and CEF-F are combined with STF sequences STF 400 and STF 1000 disclosed above to provide a non-control packet preamble set 2302 of four EDMG non-control PHY packet preamble (PP) sequence options for use in packet field 212. In FIG. 23, the set 2302 includes the packet preamble sequences PP-NC-B and PP-NC-D disclosed above, and also includes two new non-control PHY packet preamble (PP) sequence options, PP-NC-E, and PP-NC-F. As can be seen in FIG. 23, PP-NC-E includes a new STF sequence 2304 that includes 16 repetitions of the component sequence $Gb_{128}$. PP-NC-F includes a new STF sequence 2306 that includes 16 repetitions of the component sequence $Gc_{128}$. It will be noted that in each of the previous embodiments, the component sequences $Gc_{128}$ and $Gd_{128}$ were used for control STF sequences, whereas in the present embodiment the set 2302 is available for use in generating a set of four non-control STF and CEF sequences.

In 802.11ad, control packets are generally used for beamforming training in which at least one side of a communications link uses a quasi-omni antenna pattern. In at least some EDMG examples, TDD Service Period (SP) is allocated in a steady state that assumes that all traffic is transmitted through non-control packets. This means that the component sequences $Gc_{128}$ and $Gd_{128}$ do not need to be reserved for control STF sequences. Accordingly, in the embodiment of FIG. 23, the set 2302 of non-control preamble packets includes non-control STFs sequences that collectively use all of the component sequences $Ga_{128}$, $Gb_{128}$, $Gc_{128}$ and $Gd_{128}$.

Figure 24:
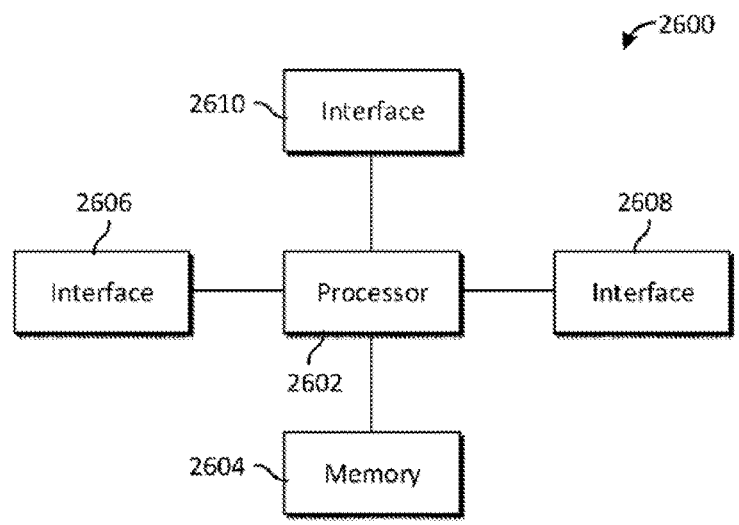
FIG. 24 is a block diagram of an example processing system in accordance with embodiments of the present disclosure.

FIG. 24 is a block diagram of an embodiment processing system 2600 for performing methods described herein, which may be installed in a host device, including for example a network distribution node such as an AP, or a client node such as an ED. As shown, the processing system 2600 includes a processor 2602, a memory 2604, and interfaces 2606-2610, which may (or may not) be arranged as shown in FIG. 24. The processor 2602 may be any component or collection of components adapted to perform computations and/or other processing related tasks, and the memory 2604 may be any component or collection of components adapted to store programming and/or instructions for execution by the processor 2602. In an embodiment, the memory 2604 includes a non-transitory computer readable medium. The interfaces 2606, 2608, 2610 may be any component or collection of components that allow the processing system 2600 to communicate with other devices/components and/or a user. For example, one or more of the interfaces 2606, 2608, 2610 may be adapted to communicate data, control, or management messages from the processor 2602 to applications installed on the host device and/or a remote device. As another example, one or more of the interfaces 2606, 2608, 2610 may be adapted to allow a user or user device (e.g., personal computer (PC), etc.) to interact/communicate with the processing system 2600. The processing system 2600 may include additional components not depicted in FIG. 24, such as long term storage (e.g., non-volatile memory, etc.).

In some embodiments, the processing system 2600 is included in a network device that is accessing, or part otherwise of, a telecommunications network. In one example, the processing system 2600 is in a network-side device in a wireless or wireline telecommunications network, such as a base station, a relay station, a scheduler, a controller, a gateway, a router, an applications server, or any other device in the telecommunications network. In other embodiments, the processing system 2600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 25:
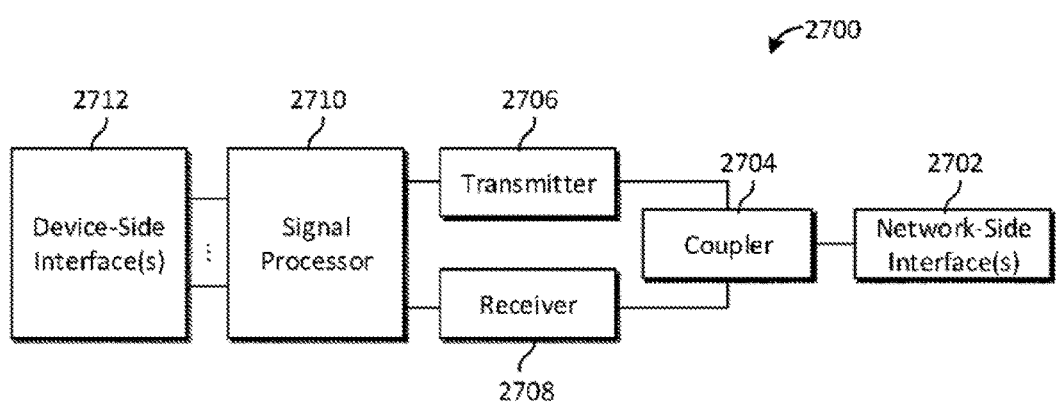
FIG. 25 is a block diagram of an example transceiver in accordance with embodiments of the present disclosure.

In some embodiments, one or more of the interfaces 2606, 2608, 2610 connects the processing system 2600 to a transceiver adapted to transmit and receive signaling over the telecommunications network. FIG. 25 is a block diagram of a transceiver 2700 adapted to transmit and receive signaling over a telecommunications network. The transceiver 2700 may be installed in a host device. As shown, the transceiver 2700 comprises a network-side interface 2702, a coupler 2704, a transmitter 2706, a receiver 2708, a signal processor 2710, and a device-side interface 2712. The network-side interface 2702 may include any component or collection of components adapted to transmit or receive signaling over a wireless or wireline telecommunications network. The coupler 2704 may include any component or collection of components adapted to facilitate bi-directional communication over the network-side interface 2702. The transmitter 2706 may include any component or collection of components (e.g., up-converter, power amplifier, etc.) adapted to convert a baseband signal into a modulated carrier signal suitable for transmission over the network-side interface 2702. The receiver 2708 may include any component or collection of components (e.g., down-converter, low noise amplifier, etc.) adapted to convert a carrier signal received over the network-side interface 2702 into a baseband signal. The signal processor 2710 may include any component or collection of components adapted to convert a baseband signal into a data signal suitable for communication over the device-side interface(s) 2712, or vice-versa. The device-side interface(s) 2712 may include any component or collection of components adapted to communicate data-signals between the signal processor 2710 and components within the host device (e.g., the processing system 2600, local area network (LAN) ports, etc.).

The transceiver 2700 may transmit and receive signaling over any type of communications medium. In some embodiments, the transceiver 2700 transmits and receives signaling over a wireless medium. For example, the transceiver 2700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2702 comprises one or more antenna/radiating elements. For example, the network-side interface 2702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 26:
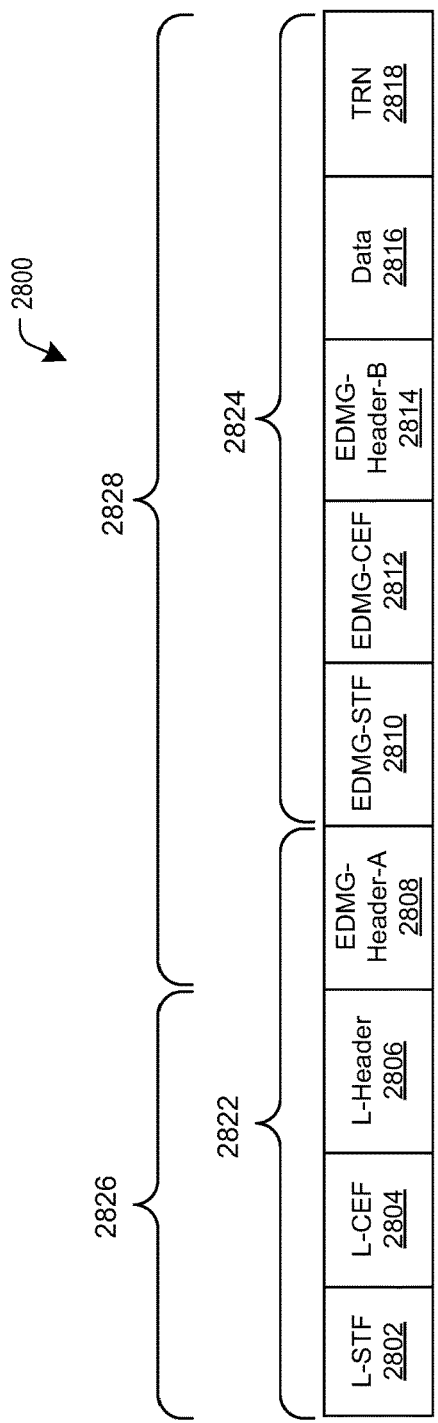
FIG. 26 is a diagram of an example packet in accordance with embodiments of the present disclosure.

FIG. 26 is a diagram of an example packet 2800, which has an example EDMG PPDU format. In comparison, the packet 200 of FIG. 2 has an example DMG PPDU format. The packet 2800 may be a wireless PHY packet, and may be a control or non-control packet.

The packet 2800 includes a legacy STF (L-STF) field 2802, a legacy CEF (L-CEF) field 2804, a legacy header (L-header) 2806, EDMG-Header-A 2808, an EDMG-STF field 2810, an EDMG-CEF field 2812, EDMG-Header-B 2814, a data payload 2816, and a training (TRN) field 2818. It should be appreciated that the packet 2800 could include other fields.

The L-STF field 2802, L-CEF field 2804, L-header 2806 and EDMG-Header-A 2808 together may be referred to as the pre-EDMG modulated fields 2822 of the packet 2800. The EDMG-STF field 2810, EDMG-CEF field 2812, EDMG-Header-B 2814, data payload 2816 and TRN field 2818 together may be referred to as the EDMG modulated fields 2824 of the packet 2800.

Further, the L-STF field 2802, L-CEF field 2804, and L-header 2806 together may be referred to as the non-EDMG portion 2826 of the packet 2800. The EDMG-Header-A 2808, the EDMG-STF field 2810, EDMG-CEF field 2812, EDMG-Header-B 2814, data payload 2816 and TRN field 2818 together may be referred to as the EDMG portion 2828 of the packet 2800.

The L-STF field 2802 and L-CEF field 2804 are used to send legacy STF and legacy CEF, in accordance with 802.11ad. According to conventional packet design for 802.11ay, CEFs that are used for MIMO transmission are located in the EDMG-CEF field 2812 following the L-Header 2806 and may be longer (e.g., double or more) than the sequence length of legacy CEF sequences. For example, according to 802.11ay, when the number of streams used for MIMO transmission is larger than two, the length of the EDMG-CEF sequence is longer than legacy CEF sequences.

The example STFs and CEFs disclosed herein may instead be located in the positions of the L-STF field 2802 and the L-CEF field 2804, respectively, and may have a length within the existing specifications for legacy STFs and legacy CEFs.

In examples described herein, new STF and CEF designs are described, based on a set of component sequences formed from pairs of Golay sequences. In some examples, the present disclosure describes a set of CEFs, where pairs of CEFs within the set have pairwise ZCZ property. This may enable the disclosed CEFs to be designed to fit within the legacy CEF field of an EDMG packet.

The receiver may store an assigned component sequence for performing target packet detection or may store the entire assigned STF sequence.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Certain adaptations and modifications of the described embodiments can be made. Therefore, the above discussed embodiments are considered to be illustrative and not restrictive.

The invention claimed is:

1. A method at a receiver, the method comprising:
receiving a wireless packet including a received short training field (STF) and a received channel estimation field (CEF);
determining whether the received STF matches an assigned STF assigned for a target link for the receiver, by performing cross-correlation between the STF and at least one component sequence from a set of at least four different component sequences, the set of component sequences being a set of pairs of Golay sequences, and comparing an output of the cross-correlation with an expected output, wherein when the received STF matches the assigned STF, the wireless packet is determined to be a target packet for the target link for the receiver;
performing a channel estimation by performing a cross-correlation of the received CEF with an assigned CEF assigned for the target link for the receiver, the assigned CEF being assigned from a set of two or more CEFs, each CEF in the set of CEFs being formed using one or more sequences from the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ; and
demodulating or ignoring a remaining portion of the wireless packet, based on whether the wireless packet is a target packet.

2. The method of claim 1 wherein the set of at least four different component sequences includes at least one of sequence $Gc_{128}$ or sequence $Gd_{128}$ wherein:

The Sequence $Gc_{128}$, from left to right, up to down, has binary values:

+1 −1 −1 +1 −1 +1 −1 +1 −1 −1 −1 −1 +1 +1 −1 −1 +1 −1 −1 +1 +1 −1 +1 −1 −1 −1 −1 −1 −1 +1 +1
−1 +1 +1 −1 +1 −1 +1 −1 +1 +1 +1 −1 −1 +1 +1 +1 −1 −1 +1 +1 −1 +1 −1 −1 −1 −1 −1 −1 +1 +1
−1 +1 +1 −1 +1 −1 +1 −1 +1 +1 +1 −1 −1 +1 +1 +1 −1 −1 +1 −1 +1 +1 +1 +1 +1 +1 +1 −1 −1
−1 +1 +1 −1 +1 −1 +1 −1 +1 +1 +1 −1 −1 +1 +1 +1 −1 −1 +1 −1 −1 −1 −1 −1 −1 +1 +1

The Sequence $Gd_{128}$ from left to right, up to down, has binary values:

+1 −1 −1 +1 −1 +1 −1 +1 −1 −1 −1 +1 +1 −1 −1 +1 −1 −1 +1 +1 −1 +1 −1 −1 −1 −1 −1 −1 +1 +1
−1 +1 +1 −1 +1 −1 +1 −1 +1 +1 +1 −1 −1 +1 +1 +1 −1 +1 −1 −1 −1 −1 −1 −1 +1 +1
+1 −1 −1 +1 −1 +1 −1 +1 −1 −1 −1 +1 +1 −1 −1 −1 +1 +1 −1 +1 −1 −1 −1 −1 −1 −1 +1 +1
+1 −1 −1 +1 −1 +1 −1 +1 −1 −1 −1 +1 +1 −1 −1 −1 +1 −1 +1 +1 +1 +1 +1 +1 −1 −1.

3. The method of claim 2 wherein the set of at least four different component sequences includes both of the sequences $Gc_{128}$ and $Gc_{128}$.

4. The method of claim 3 wherein the set of at least four different component sequences further includes sequence $Ga_{128}$ and sequence $Gb_{128}$, wherein:

The Sequence $Ga_{128}$, from left to right, up to down, has binary values:

+1 +1 −1 −1 −1 −1 −1 −1 −1 +1 −1 +1 +1 −1 −1 +1 +1 +1 −1 −1 +1 +1 +1 −1 +1 −1 +1 −1 +1 +1 −1
−1 −1 +1 +1 +1 +1 +1 +1 +1 −1 +1 −1 −1 +1 +1 −1 +1 +1 −1 −1 +1 +1 +1 −1 +1 −1 +1 −1 +1 +1 −1
+1 +1 −1 −1 −1 −1 −1 −1 −1 +1 +1 −1 +1 +1 −1 −1 +1 +1 +1 −1 +1 −1 +1 −1 +1 +1 −1
+1 +1 −1 −1 −1 −1 −1 −1 +1 −1 +1 +1 −1 −1 +1 +1 −1 −1 −1 +1 −1 +1 −1 +1 −1 −1 +1

The Sequence $Gb_{128}$ from left to right, up to down, has binary values:

−1 −1 +1 +1 +1 +1 +1 +1 −1 +1 −1 −1 +1 +1 −1 −1 −1 +1 +1 −1 −1 −1 +1 −1 +1 −1 +1 −1 −1 +1
+1 +1 −1 −1 −1 −1 −1 −1 +1 −1 +1 +1 −1 −1 +1 +1 −1 −1 −1 +1 −1 +1 −1 +1 −1 −1 +1
+1 +1 −1 −1 −1 −1 −1 −1 +1 −1 +1 +1 −1 −1 +1 +1 −1 −1 −1 +1 −1 +1 −1 +1 −1 −1 +1
+1 +1 −1 −1 −1 −1 −1 −1 +1 −1 +1 +1 −1 −1 +1 +1 −1 −1 −1 +1 −1 +1 −1 +1 −1 −1 +1.

5. The method of claim 1, wherein comparing an output of the cross-correlation with an expected output comprises:
determining a quantity of cross-correlation peaks between the at least one component sequence and the received STF; and comparing the determined quantity of cross-correlation peaks to an expected number of cross-correlation peaks for the assigned STF;
wherein a match between the determined quantity of cross-correlation peaks and the expected number of cross-correlation peaks indicates that the wireless packet is a target packet transmitted in the target link for the receiver.

6. The method of claim 1, further comprising:
after determining that the wireless packet is a target packet for the receiver, performing the channel estimation for the target link based on a cross-correlation of the received CEF and the assigned CEF; and
demodulating a payload in the remaining portion of the wireless packet, based on at least the channel estimation for the target link.

7. The method of claim 1, further comprising:
after determining that the wireless packet is not a target packet for the receiver, performing the channel estimation for an interfering link based on a cross-correlation of the received CEF and another CEF, other than the assigned CEF, in the set of CEFs; and
ignoring the remaining portion of the wireless packet.

8. The method of claim 1, further comprising:
receiving, from a network controller, an indication of the assigned STF to be used for determining whether the wireless packet is a target packet for the receiver.

9. The method of claim 8, further comprising:
transmitting, to the network controller, information regarding measured co-channel interference conditions;

wherein the assigned sequence is assigned by the network controller based on the information regarding measured co-channel interference conditions.

10. The method of claim 1, further comprising:
storing a plurality of assigned STFs or assigned component sequences from the set of at least four different component sequences, wherein each assigned STF or assigned component sequence is assigned to a respective link; and
determining which of the plurality of assigned STFs or assigned component sequences to use for determining whether the wireless packet is a target packet for the receiver, based on the link for a target packet for the receiver.

11. A method at a transmitter, the method comprising:
storing at least one assigned short training field (STF) sequence and at least one assigned channel estimation field (CEF) sequence;
the assigned STF sequence being formed from one component sequence of a set of at least four different component sequences, the set of at least four different component sequences being a set of pairs of Golay sequences;
the assigned CEF sequence being from a set of two or more CEFs, each CEF in the set of CEFs being formed from one or more sequences of the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ;
generating a wireless packet including the assigned STF sequence and the assigned CEF sequence; and
transmitting the wireless packet over a transmission link.

12. The method of claim 11 wherein the set of at least four different component sequences includes at least one of sequence $Gc_{128}$ or sequence $Gd_{128}$ wherein:

The Sequence $Gc_{128}$, from left to right, up to down, has binary values:

+1 −1 −1 +1 −1 +1 −1 +1 −1 −1 −1 +1 +1 −1 −1 +1 −1 −1 +1 +1 −1 +1 −1 −1 −1 −1 −1 −1 +1 +1
−1 +1 +1 −1 +1 −1 +1 −1 +1 +1 +1 +1 +1 +1 −1 +1 −1 −1 −1 −1 −1 −1 −1 −1 −1 −1 −1 −1 +1 +1
−1 +1 +1 −1 +1 −1 +1 −1 +1 +1 +1 +1 −1 −1 +1 +1 −1 +1 +1 −1 −1 +1 +1 +1 +1 +1 +1 +1 −1 −1
−1 +1 +1 −1 +1 −1 +1 −1 +1 +1 +1 +1 −1 −1 +1 +1 −1 +1 −1 −1 −1 −1 −1 −1 −1 −1 +1 +1

The Sequence $Gd_{128}$ from left to right, up to down, has binary values:

+1 −1 −1 +1 −1 +1 −1 +1 −1 −1 −1 +1 +1 −1 −1 +1 −1 −1 +1 +1 −1 +1 −1 −1 −1 −1 −1 −1 +1 +1
−1 +1 +1 −1 +1 −1 +1 −1 +1 +1 +1 +1 +1 +1 −1 +1 −1 −1 −1 −1 −1 −1 −1 −1 −1 −1 −1 −1 +1 +1
+1 −1 −1 +1 −1 +1 −1 +1 −1 −1 −1 +1 +1 −1 −1 −1 +1 +1 −1 +1 −1 −1 −1 −1 −1 −1 −1 −1 +1 +1
+1 −1 −1 +1 −1 +1 −1 +1 −1 −1 −1 +1 +1 −1 −1 −1 +1 +1 −1 −1 +1 −1 +1 +1 +1 +1 +1 +1 −1 −1.

13. The method of claim 12 wherein the set of at least four different component sequences includes both of the sequences $Gc_{128}$ and $Gd_{128}$.

14. The method of claim 12 wherein the set of at least four different component sequences further includes sequence $Ga_{128}$ and sequence $Gb_{128}$, wherein:

The Sequence $Ga_{128}$, from left to right, up to down, has binary values:

+1 +1 −1 −1 −1 −1 −1 −1 −1 +1 −1 +1 +1 −1 −1 +1 +1 +1 −1 −1 +1 +1 +1 +1 −1 +1 −1 +1 −1 +1 +1 −1
−1 −1 +1 +1 +1 +1 +1 +1 +1 −1 +1 −1 −1 +1 +1 −1 +1 +1 −1 −1 +1 +1 +1 +1 −1 +1 −1 +1 −1 +1 +1 −1
+1 +1 −1 −1 −1 −1 −1 −1 −1 +1 −1 +1 +1 −1 −1 +1 +1 +1 −1 −1 +1 +1 +1 +1 −1 +1 −1 +1 −1 +1 +1 −1
+1 +1 −1 −1 −1 −1 −1 −1 −1 +1 −1 +1 +1 −1 −1 +1 −1 −1 +1 +1 −1 −1 −1 −1 +1 −1 +1 −1 +1 −1 −1 +1

The Sequence $Gb_{128}$ from left to right, up to down, has binary values:

−1 −1 +1 +1 +1 +1 +1 +1 +1 −1 +1 −1 −1 +1 +1 −1 −1 +1 −1 −1 +1 −1 +1 −1 +1 −1 +1 −1 −1 +1
+1 +1 −1 −1 −1 −1 −1 −1 −1 +1 −1 +1 +1 −1 −1 +1 +1 +1 −1 −1 +1 +1 +1 +1 −1 +1 −1 +1 −1 +1 +1 −1
+1 +1 −1 −1 −1 −1 −1 −1 −1 +1 −1 +1 +1 −1 −1 +1 +1 +1 −1 −1 +1 +1 +1 +1 −1 +1 −1 +1 −1 +1 +1 −1
+1 +1 −1 −1 −1 −1 −1 −1 +1 −1 +1 −1 −1 +1 −1 −1 +1 +1 −1 −1 −1 +1 −1 +1 −1 +1 −1 +1 −1 −1 +1.

15. The method of claim 11, further comprising:

receiving, from a network controller, an indication of the assigned STF sequence and the assigned CEF sequence.

16. The method of claim 15, further comprising:
transmitting, to the network controller, information regarding measured co-channel interference conditions;
wherein the assigned STF sequence and assigned CEF sequence are assigned by the network controller based on the information regarding measured co-channel interference conditions.

17. The method of claim 11, further comprising:
storing a plurality of assigned STF sequences and a plurality of assigned CEF sequences, wherein each assigned STF sequence and each assigned CEF sequence is assigned to a respective transmission link; and
determining which of the plurality of assigned STF sequences and which of the plurality of assigned CEF sequences to use for generating the wireless packet, depending on at least one of the transmission link.

18. A device in a millimeter-wave (mmWave) wireless communication network, the device comprising:
a receiver for receiving a wireless packet over a target link;
a memory; and
a processor coupled to the receiver and the memory, the processor being configured to execute instructions to cause the device to:
receive a wireless packet including a received short training field (STF) and a received channel estimation field (CEF);
determine whether the received STF matches an assigned STF assigned for a target link for the receiver, by performing cross-correlation between the STF and at least one component sequence from a set of at least four different component sequences, the set of at least four different component sequences being a set of pairs of Golay sequences, and comparing an output of the cross-correlation with an expected output, wherein when the received STF matches the assigned STF, the wireless packet is determined to be a target packet for the target link for the receiver;
perform a channel estimation by performing a cross-correlation of the received CEF with an assigned CEF assigned for the target link for the receiver, the assigned CEF being assigned from a set of two or more CEFs, each CEF in the set of CEFs being formed using one or more sequences from the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ; and
demodulate or ignore a remaining portion of the wireless packet, based on whether the wireless packet is a target packet.

19. A device in a millimeter-wave (mmWave) wireless communication network, the device comprising:
a transmitter for transmitting a wireless packet over a transmission link;
a memory; and
a processor coupled to the receiver and the memory, the processor being configured to execute instructions to cause the device to:
store at least one assigned short training field (STF) sequence and at least one assigned channel estimation field (CEF) sequence;
the assigned STF sequence being formed from one component sequence of a set of at least four different component sequences, the set of at least four different component sequences being a set of pairs of Golay sequences;
the assigned CEF sequence being from a set of two or more CEFs, each CEF in the set of CEFs being formed from one or more sequences of the set of at least four different component sequences, the CEFs within the set of CEFs being pairwise zero-correlation zone (ZCZ) sequences, such that each pair of CEFs has negligible cross-correlation output over a ZCZ and each CEF has a delta function auto-correlation over the ZCZ;
generate a wireless packet including the assigned STF sequence and the assigned CEF sequence; and
transmit the wireless packet over a transmission link.

* * * * *